(12) United States Patent
Schubert et al.

(10) Patent No.: US 10,962,650 B2
(45) Date of Patent: Mar. 30, 2021

(54) POLYHEDRAL GEOFENCES

(71) Applicant: ANALYTICAL MECHANICS ASSOCIATES, INC., Hampton, VA (US)

(72) Inventors: Matthew Schubert, Hampton, VA (US); Andrew Moore, Hampton, VA (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 221 days.

(21) Appl. No.: 16/177,077

(22) Filed: Oct. 31, 2018

(65) Prior Publication Data

US 2019/0129039 A1    May 2, 2019

Related U.S. Application Data

(60) Provisional application No. 62/579,284, filed on Oct. 31, 2017.

(51) Int. Cl.
*G01S 17/93* (2020.01)
*G01S 17/933* (2020.01)
(Continued)

(52) U.S. Cl.
CPC ............ *G01S 17/933* (2013.01); *G01S 17/86* (2020.01); *G01S 17/89* (2013.01); *G05D 1/0088* (2013.01);
(Continued)

(58) Field of Classification Search
CPC ........ G01S 17/933; G01S 17/86; G01S 17/89; G05D 1/106; G05D 1/0088; G08G 5/045; G08G 5/0021; G08G 5/0052; G08G 5/0069; G08G 5/006; G08G 5/0086; B64C 2201/0141; B64C 39/024
See application file for complete search history.

(56) References Cited

U.S. PATENT DOCUMENTS 6,420,698 B1    7/2002   Dimsdale
8,244,026 B2    8/2012   Nahari et al.
(Continued)

FOREIGN PATENT DOCUMENTS

BR     102012019160 A2    9/2013
CN        104732588 B     6/2016
(Continued)

OTHER PUBLICATIONS

Balachandran, et al. "A Path Planning Algorithm to Enable Well-Clear Low Altitude UAS Operation Beyond Visual Line of Sight." Twelfth USA/Europe Air Traffic Management Research and Development Seminar (ATM2017).
(Continued)

*Primary Examiner* — Mary Cheung
(74) *Attorney, Agent, or Firm* — Mueting Raasch Group

(57) ABSTRACT

Exemplary methods and systems may generate a point cloud data generated polyhedral geofence for use in navigating a vehicle. The polyhedral geofence may be generated, or created, from point cloud data such as lidar data. Further, a vehicle may utilize propulsion devices and controllers for moving the vehicle based on a point map data generated polyhedral geofence.

35 Claims, 19 Drawing Sheets

(51) Int. Cl.

| | | |
|---|---|---|
| *G01S 17/89* | (2020.01) | |
| *G08G 5/00* | (2006.01) | |
| *G05D 1/00* | (2006.01) | |
| *G08G 5/04* | (2006.01) | |
| *G01S 17/86* | (2020.01) | |
| *G05D 1/10* | (2006.01) | |
| *B64C 39/02* | (2006.01) | |

(52) U.S. Cl.
CPC ............ *G05D 1/106* (2019.05); *G08G 5/006* (2013.01); *G08G 5/0021* (2013.01); *G08G 5/0052* (2013.01); *G08G 5/0069* (2013.01); *G08G 5/0086* (2013.01); *G08G 5/045* (2013.01); *B64C 39/024* (2013.01); *B64C 2201/141* (2013.01)

(56) References Cited

U.S. PATENT DOCUMENTS

| | | | |
|---|---|---|---|
| 8,680,994 | B2 | 3/2014 | Leppamen et al. |
| 8,751,154 | B2 | 6/2014 | Zhang et al. |
| 8,849,494 | B1 | 9/2014 | Herbach et al. |
| 8,930,044 | B1 | 1/2015 | Peeters et al. |
| 8,989,944 | B1 | 3/2015 | Agarwal et al. |
| 8,996,224 | B1 | 3/2015 | Herbach et al. |
| 9,008,890 | B1 | 4/2015 | Herbach et al. |
| 9,036,861 | B2 | 5/2015 | Chen et al. |
| 9,043,069 | B1 | 5/2015 | Ferguson et al. |
| 9,285,230 | B1 | 3/2016 | Silver et al. |
| 9,335,764 | B2 | 5/2016 | Herz et al. |
| 9,507,346 | B1 | 11/2016 | Levinson et al. |
| 9,513,635 | B1 | 12/2016 | Bethke et al. |
| 9,524,647 | B2 | 12/2016 | Kohn-Rich |
| 9,606,539 | B1 | 3/2017 | Kentley et al. |
| 9,609,288 | B1 | 3/2017 | Richman et al. |
| 9,612,123 | B1 | 4/2017 | Levinson et al. |
| 9,632,502 | B1 | 4/2017 | Levinson et al. |
| 9,734,455 | B2 | 8/2017 | Levinson et al. |
| 9,740,200 | B2 | 8/2017 | Bethke |
| 9,753,124 | B2 | 9/2017 | Hayes |
| 9,835,453 | B2 | 12/2017 | Michini et al. |
| 9,875,657 | B2 | 1/2018 | Collins |
| 9,881,213 | B2 | 1/2018 | Michini et al. |
| 9,910,441 | B2 | 3/2018 | Levinson et al. |
| 9,916,703 | B2 | 3/2018 | Levinson et al. |
| 9,919,723 | B2 | 3/2018 | Bhagwatkar et al. |
| 9,933,784 | B1 | 4/2018 | Herbach et al. |
| 9,958,864 | B2 | 5/2018 | Kentley-Klay et al. |
| 10,096,154 | B2 | 10/2018 | Liu et al. |
| 10,313,638 | B1* | 6/2019 | Yeturu .............. G06K 9/00637 |
| 2011/0216063 | A1 | 9/2011 | Hayes |
| 2013/0300740 | A1 | 11/2013 | Snyder et al. |
| 2015/0369618 | A1* | 12/2015 | Barnard .................. H04W 4/70 701/491 |
| 2016/0070265 | A1 | 3/2016 | Liu et al. |
| 2016/0307447 | A1* | 10/2016 | Johnson .............. G08G 5/0069 |
| 2017/0192418 | A1* | 7/2017 | Bethke ................. G08G 5/0013 |
| 2017/0193830 | A1* | 7/2017 | Fragoso ................. G05D 1/102 |
| 2017/0242442 | A1 | 8/2017 | Minster |
| 2017/0248963 | A1 | 8/2017 | Levinson et al. |
| 2017/0285092 | A1 | 10/2017 | Moore |
| 2017/0300059 | A1 | 10/2017 | Rust |
| 2017/0316115 | A1 | 11/2017 | Lewis et al. |
| 2017/0316333 | A1 | 11/2017 | Levinson et al. |
| 2017/0334559 | A1* | 11/2017 | Bouffard .............. G08G 5/0082 |
| 2017/0336806 | A1* | 11/2017 | Blanc-Paques ........ G08G 5/045 |
| 2017/0351261 | A1 | 12/2017 | Levinson et al. |
| 2018/0002010 | A1 | 1/2018 | Bauer et al. |
| 2018/0004207 | A1 | 1/2018 | Michini et al. |
| 2018/0025649 | A1 | 1/2018 | Contreras et al. |
| 2018/0090013 | A1 | 3/2018 | Park et al. |
| 2018/0094931 | A1 | 4/2018 | Taylor et al. |
| 2018/0096611 | A1 | 4/2018 | Kikuchi et al. |
| 2018/0114449 | A1 | 4/2018 | Kohn-Rich |
| 2018/0158341 | A1 | 6/2018 | Collins |
| 2018/0188721 | A1 | 7/2018 | Bethke |
| 2018/0190046 | A1 | 7/2018 | Levinson et al. |
| 2018/0194463 | A1 | 7/2018 | Hasinski et al. |
| 2018/0196437 | A1 | 7/2018 | Herbach et al. |
| 2018/0196439 | A1 | 7/2018 | Levinson et al. |
| 2018/0204469 | A1 | 7/2018 | Moster et al. |
| 2018/0246529 | A1 | 8/2018 | Hu et al. |
| 2018/0341263 | A1 | 11/2018 | Rust |
| 2018/0356821 | A1 | 12/2018 | Kentley-Klay et al. |
| 2019/0011921 | A1 | 1/2019 | Wang et al. |
| 2019/0072949 | A1* | 3/2019 | Charalambides .... G08G 5/0078 |

FOREIGN PATENT DOCUMENTS

| | | |
|---|---|---|
| DE | 102018112115 A1 | 11/2018 |
| EP | 3103043 A1 | 12/2016 |
| EP | 3368957 A1 | 9/2018 |
| EP | 3371023 A1 | 9/2018 |
| EP | 3371772 A1 | 9/2018 |
| EP | 3371794 A1 | 9/2018 |
| EP | 3371795 A1 | 9/2018 |
| EP | 3371797 A2 | 9/2018 |
| EP | 3374836 A1 | 9/2018 |
| EP | 3398093 A1 | 11/2018 |
| GB | 2457215 A | 8/2009 |
| JP | 6174073 B2 | 2/2017 |
| JP | 2017174442 A | 9/2017 |
| JP | 2018024652 A | 2/2018 |
| JP | 2018504652 A | 2/2018 |
| JP | 2018055695 A | 4/2018 |
| JP | 2018535487 A | 11/2018 |
| JP | 6447895 B2 | 1/2019 |
| JP | 2019501468 A | 1/2019 |
| KR | 100935857 B1 | 1/2010 |
| KR | 100965838 B1 | 6/2010 |
| KR | 101099443 B1 | 12/2011 |
| RU | 2669656 C2 | 10/2018 |
| WO | WO 2016/012790 A1 | 1/2016 |
| WO | WO 2016/033797 A1 | 3/2016 |
| WO | WO 2016/093908 A2 | 6/2016 |
| WO | WO 2016/130994 A1 | 8/2016 |
| WO | WO 2017/045251 A1 | 3/2017 |
| WO | WO 2017/071143 A1 | 5/2017 |
| WO | WO 2017/079222 A1 | 5/2017 |
| WO | WO 2017/079228 A2 | 5/2017 |
| WO | WO 2017/079229 A1 | 5/2017 |
| WO | WO 2017/079290 A1 | 5/2017 |
| WO | WO 2017/079301 A1 | 5/2017 |
| WO | WO 2017/079321 A1 | 5/2017 |
| WO | WO 2017/079341 A1 | 5/2017 |
| WO | WO 2017/079460 A2 | 5/2017 |
| WO | WO 2017/100658 A1 | 6/2017 |
| WO | WO 2017/116841 A1 | 7/2017 |
| WO | WO 2017/116860 A1 | 7/2017 |
| WO | WO 2017/139282 A1 | 8/2017 |
| WO | WO 2017/147142 A1 | 8/2017 |
| WO | WO 2018/057828 A3 | 3/2018 |
| WO | WO 2018/086141 A1 | 5/2018 |
| WO | WO 2018/125938 A1 | 7/2018 |
| WO | WO 2018/161338 A1 | 9/2018 |
| WO | WO 2018/193574 A1 | 10/2018 |
| WO | WO 2019/000417 A1 | 1/2019 |

OTHER PUBLICATIONS

Chida et al., "Reconstruction of polygonal prisms from point-clouds of engineering facilities," *Journal of Computational Design and Engineering*, 2016; 3(4):322-329.
Consiglio, et al. "ICAROUS: Integrated configurable algorithms for reliable operations of unmanned systems." Digital Avionics Systems Conference (DASC), 2016 IEEE/AIAA 35th. IEEE, 2016.
ESRI 2016. ArcGIS Desktop: Release 10.4.1. Redlands, CA: Environmental Systems Research Institute.
Federal Aviation Administration, "ILS RWY 26R Hartsfield-Jackson Atlanta Intl (ATL)," Sep. 2014, http://aeronav.faa.gov/d-tpp/1708/00026I26RSAC1_2.PDF [retrieved Aug. 16, 2017].

(56) References Cited

OTHER PUBLICATIONS

Ippolito, et al. "Preliminary results of powerline reconstruction from airborne LiDAR for safe autonomous low-altitude urban operations of small UAS." SENSORS, 2016 IEEE. IEEE, 2016.

Kopardekar et al., "Unmanned Aircraft System Traffic Management (UTM) Concept of Operations" 16$^{th}$ AIAA Aviation Technology, Integration, and Operations Conference. Washington D.C., Jun. 13-17, 2016.

Kwon et al., "Fitting range data to primitives for rapid local 3D modeling using sparse range point clouds," *Automation in Construction*, 2004; 13(1):67-81.

Lefsky et al., "Lidar remote sensing for ecosystem studies: Lidar, an emerging remote sensing technology that directly measures the three-dimensional distribution of plant canopies, can accurately estimate vegetation structural attributes and should be of particular interest to forest, landscape, and global ecologists," *BioScience*, Jan. 2002; 52(1):19-30.

Matikainen et al., "Remote Sensing Methods for Power Line Corridor Surveys," *ISPRS Journal of Photogrammetry and Remote Sensing*, 2016; 119:10-31.

Menendez et al., "Vision Based Inspection of Transmission Lines Using Unmanned Aerial Vehicles," Sep. 19-21, 2016, IEEE International Conference.

Mizoguchi, Tomohiro, et al. "Manhattan-world assumption for as-built modeling industrial plant.", 2012, Key Engineering Materials. vol. 523. Trans Tech Publications.

Moore et al., "Autonomous Inspection of Electrical Transmission Structures with Airborne UV Sensors NASA Report on Dominion Virginia Power Flights of Nov. 2016," 2017, NASA Technical Memo 2017-219611.

Moore et al., "UAV Inspection of Electrical Transmission Infrastructure with Path Conformance Autonomy and Lidar-based Geofences NASA Report on UTM Reference Mission Flights at Southern Company Flights Nov. 2016," 2017, NASA Technical Memo 2017-219673.

Muñoz, César, et al. "DAIDALUS: detect and avoid alerting logic for unmanned systems." Digital Avionics Systems Conference (DASC), 2015 IEEE/AIAA 34th. IEEE, 2015.

Narkawicz, Anthony, and George Hagen. "Algorithms for collision detection between a point and a moving polygon, with applications to aircraft weather avoidance." Proceedings of the AIAA Aviation Conference. 2016.

Parkinson, Bradford W., and Per K. Enge. "Differential gps.", Global Positioning System: Theory and applications. 2 (1996): 3-50.

Pendleton et al. "Perception, Planning, Control, and Coordination for Autonomous Vehicles" Machines, Feb. 17, 2017; 5(1): 6. 54 pages.

Pérez-Grau, F. J., et al. "Long-term aerial robot localization based on visual odometry and radio-based ranging." Unmanned Aircraft Systems (ICUAS), 2016 International Conference on. IEEE, 2016.

Rusu, et al., "3d is here: Point cloud library (PCL)," Robotics and automation (ICRA), 2011 IEEE International Conference on. IEEE, 2011.

Serrano, et al., "Carrier-phase multipath calibration in GPS-RTK machine-guidance applications." In Position, Location and Navigation Symposium, 2008 IEEE/ION, pp. 479-488.

Sokhandan, "A Novel Multipath Estimation and Tracking Algorithm for Urban GNSS Navigation Applications." Conference Paper Presented at the Proceedings of ION GNSS+ 2013, Nashville TN, Sep. 16-20, 2013; 16 pages. 16-20. Available online at <schulich.ucalgary.ca/labs/position-location-and-navigation/files/position-location-and-navigation/sokhandan2013_article.pdf>.

Vosselman et al., "Recognising structure in laser scanner point clouds," *The International Archives of the Photogrammetry, Remote Sensing and Spatial Information Sciences*, 2004; 46(8):33-38.

Weill, "Conquering multipath: The GPS accuracy battle." GPS world 4 (1997): 59-66. http://www2.unb.ca/gge/Resources/gpsworld.april97.pdf.

Wolf, "LiDAR Meets NERC Alert." Transmission & Distribution World 63.8 (2011): 9-13. Accessed online at <insurancenewsnet.com/oarticle/LiDAR-Meets-NERC-Alert-a-271367#> on Oct. 28, 2020. 7 pages.

Xie, et al., "Improving high sensitivity GNSS receiver performance in multipath environments for vehicular applications." Thesis, Department of Geomatics Engineering. University of Calgary, Alberta. Sep. 2013; 210 pages. https://www.researchgate.net/publication/293175484_Improving_High_Sensitivity_GNSS_Receiver_Performance_in_Multipath_Environments_for_Vehicular_Applications.

\* cited by examiner

POLYHEDRAL GEOFENCES

This application claims the benefit of U.S. Provisional Application No. 62/579,284, filed Oct. 31, 2017.

This invention was made with Government support under contract number NNL12AA09C awarded by NASA. The government has certain rights in the invention.

The present disclosure pertains to systems and methods for generating and using polyhedral geofences from point cloud coordinate data such as lidar data.

The intermittency of the Global Positioning System (GPS) at low altitudes and in urban and industrial environments can be ameliorated by taking advantage of lidar maps of the terrains and low-altitude objects. High accuracy, high precision aerial lidar maps are available for much of the high voltage infrastructure and proximate foliage and buildings in North America. However, the richness of this data may create a computational challenge because the data volume of the raw lidar maps may be too high for real time processing, even for modest areas that may be traversed on a single battery charge by a rotary unmanned aerial vehicle (UAV).

SUMMARY

Polyhedral geofences can be generated from point cloud data such as high-fidelity lidar data providing a reduction in data that may allow for real-time processing in vehicles (e.g., flying vehicles such as drones, helicopters, and airplanes, ground vehicles such as automobiles and motorcycles, amphibious vehicles such as submarines and ships, etc.). Polyhedral geofences may include 2.5-dimensional (2.5D) and/or 3-dimensional (3D) polyhedral geofences thereby simplifying high-density point clouds into one or more polyhedrons. Vehicles may maneuver to a safe and effective standoff distance to inspect structures based on the polyhedral geofences generated from the point cloud data. In one or more embodiments, vehicles may verify their positional coordinates based upon the polyhedral geofences and a sensed distance to one or more structures. In this context, 2.5D refers to a surface extruded along a third dimension, e.g., from the ground upwards.

High-fidelity aerial lidar data can be converted to 2.5-dimensional (2.5D) and/or 3-dimensional (3D) polyhedral geofences. For example, polyhedral wrappers or bounding boxes can be fixed around buildings, towers, trees, power lines, etc. Using lidar-data generated polyhedral geofences as described herein may reduce data volume by orders of magnitude, allowing real-time computation. Lidar-data generated polyhedral geofences may be used by a flight crew to verify a safe standoff distance from various structures by comparing the flight path of a vehicle to the polyhedral geofences in a 3D map. Waypoints of an autonomous flight can be checked to ensure a safe distance from a 2.5D or 3D lidar-data generated polyhedral geofences. Additionally, lidar-data generated polyhedral geofences may be checked by flight guidance software that performs collision avoidance maneuvers.

Lidar-data generated polyhedral geofences may provide position determination by comparing polyhedral representations of structures sensed in-flight (via on-board lidar or other ranged sensors) with lidar-data generated polyhedral geofences of known structures. Position determination using lidar-data generated polyhedral geofences has the potential to meet or exceed global positioning system (GPS) accuracy near ground structures. Due to its data reduction properties, polyhedral representation of structures via lidar-data generated polyhedral geofences can be a routine ingredient in vehicle navigation (including, e.g., autonomous navigation).

Consolidation of lidar maps to lidar-data generated polyhedral geofences (e.g., polyhedral obstacle maps) may reduce data volume by orders of magnitude, and may allow for real-time computation by an aerial vehicle for e.g., collision avoidance maneuvers, etc., which may enable, or allow, real-time obstacle avoidance autonomy. Using 3D lidar-data generated polyhedral geofences for planning and obstacle avoidance may decrease data volume by, e.g., a factor of about 50 to about 100. Using 2.5D lidar-data generated polyhedral geofences may produce a spatial representation sufficient for planning and safety and may reduce the data volume by a further factor of, e.g., a factor of about 20 to about 50 over 3D lidar-data generated polyhedral geofences or a factor of about 1000 to about 5000 over point cloud data. An illustrative UAV can sense ground structures and compare such ground structures to lidar-data generated polyhedral geofences to determine position in GPS-degraded or GPS-deprived environments, which may provide stable navigation in GPS-degraded or GPS-deprived environments, such as near transmission lines.

Consolidation from point cloud data to 2.5D and 3D point cloud-data generated polyhedral geofences that reduce data volume by orders of magnitude are described herein. For both 2.5D and 3D point cloud-data generated polyhedral geofences data volume reduction enables their use for vehicle navigation (including, e.g., autonomous navigation) in a dense obstacle field.

An exemplary aerial vehicle may include a propulsion apparatus and a controller. The propulsion apparatus may include at least one engine to provide propulsion. The controller may include one or more processors operably coupled to the propulsion apparatus to control flight of the vehicle. The controller may be configured to fly the vehicle using the propulsion apparatus based on at least a lidar-data generated polyhedral geofence.

In one or more embodiments, the exemplary aerial vehicle may further include a positioning system used to determine three-dimensional coordinates of the aerial vehicle. The controller may fly the aerial vehicle using the propulsion apparatus further based on at least the determined three-dimensional coordinates. In one or more embodiments, the positioning system may include a lidar sensor system to sense distance between the aerial vehicle and one or more structures. In one or more embodiments the controller may determine three-dimensional coordinates based on at least the lidar-data generated polyhedral geofence and the distance between the aerial vehicle and the one or more structures. In one or more embodiments, the positioning system may include a global positioning system (GPS) to determine the three-dimensional coordinates. The GPS may include an antenna to receive GPS signals. In one or more embodiments, the controller may fly the aerial vehicle to avoid one or more objects defined by the lidar-data generated polyhedral geofence. In one or more embodiments, the controller may fly the aerial vehicle according to a flight path to inspect one or more objects defined by the lidar-data generated polyhedral geofence.

In one or more embodiments, the controller may fly the vehicle to within a selected inspection distance from the one or more objects for inspection. In one or more embodiments the aerial vehicle may further include a sensor to gather inspection data from one or more objects defined by the lidar-data generated polyhedral geofence. In one or more embodiments, the lidar-data generated polyhedral geofence may be a 2.5-dimensional (2.5D) polyhedral geofence comprising a plurality of 2.5D polyhedrons. Each of the plurality of 2.5D polyhedrons may be defined by a polygonal area extending from a ground surface to a maximum altitude. In one or more embodiments, the lidar-data generated polyhedral geofence may be a 3-dimensional (3D) polyhedral geofence comprising a plurality of 3D polyhedrons. Each of the plurality of 3D polyhedrons may be defined by a polyhedral volume.

An exemplary method of flying an aerial vehicle may include flying the vehicle based on at least a lidar-data generated polyhedral geofence. In one or more embodiments, the method may further include determining three-dimensional coordinates of the aerial vehicle. Flying the aerial vehicle may be further based on at least the determined three-dimensional coordinates. In one or more embodiments, the method may further include sensing distance between the aerial vehicle and one or more structures. In one or more embodiments, determining three-dimensional coordinates may be based on at least the lidar-data generated polyhedral geofence and the distance between the aerial vehicle and the one or more structures. In one or more embodiments, the method may further include receiving GPS signals. Determining three-dimensional coordinates may be based on at least the received GPS signals. In one or more embodiments, the method may further include flying the aerial vehicle to avoid one or more objects defined by the lidar-data generated polyhedral geofence.

In one or more embodiments, the method may further include flying the aerial vehicle according to a flight path to inspect one or more objects defined by the lidar-data generated polyhedral geofence. In one or more embodiments, the method may further include flying the aerial vehicle to within a selected inspection distance of the one or more objects for inspection. In one or more embodiments, the method may further include detecting a defect in one or more objects defined by the lidar-data generated polyhedral geofence. In one or more embodiments, the lidar-data generated polyhedral geofence may be a 2.5-dimensional (2.5D) polyhedral geofence including a plurality of 2.5D polyhedrons. Each of the plurality of 2.5D polyhedrons may be defined by a polygonal area extending from a ground surface to a maximum altitude. In one or more embodiments, the lidar-data generated polyhedral geofence may be a 3-dimensional (3D) polyhedral geofence including a plurality of 3D polyhedrons. Each of the plurality of 3D polyhedrons may be defined by a polyhedral volume.

An exemplary method of generating a polyhedral geofence for a vehicle may include receiving lidar data and generating a polyhedral geofence based on the lidar data. The polyhedral geofence may be usable by a vehicle. In one or more embodiments, the lidar-data generated polyhedral geofence may be a 2.5-dimensional (2.5D) polyhedral geofence including a plurality of 2.5D polyhedrons. Each of the plurality of 2.5D polyhedrons may be defined by a polygonal area extending from a ground surface to a maximum altitude. In one or more embodiments, the lidar-data generated polyhedral geofence may be a 3-dimensional (3D) polyhedral geofence including a plurality of 3D polyhedrons. Each of the plurality of 3D polyhedrons may be defined by a polyhedral volume. In one or more embodiments, the lidar-data generated polyhedral geofence may include at least one 2.5-dimensional polyhedron and at least one 3-dimensional polyhedron.

In one or more embodiments, generating the polyhedral geofence from the lidar data may include determining a set of triplets from the lidar data, each triplet of the set of triplets representing a latitude, a longitude, and an altitude of a point of an object, determining one or more features based on the set of triplets, determining one or more polyhedrons, each polyhedron fitted to one of the one or more features, and generating the polyhedral geofence comprising the determined one or more polyhedrons.

In one or more embodiments, determining the one or more features may include determining a grid for each of the one or more features based on a minimum feature spacing of the latitude and longitude of each triplet of the set of triplets. The grid may include a polygonal area. In one or more embodiments, determining the one or more polyhedrons may include determining a maximum altitude for each of the one or more features, and determining a shape and size of each of the one or more polyhedrons based on a polygonal area and the maximum altitude.

In one or more embodiments, determining the one or more features may include clustering the set of triplets using cylindrical modeling. Cylindrical modeling may include, for example, grouping the set of triplets into neighborhoods based on a feature radius, and merging the neighborhoods into the one or more features based on an eigenvector-aligned cylindrical filter and an eigenvector angle alignment filter. In one or more embodiments, determining the one or more polyhedrons may include determining a minimum bounding box for each of the one or more features. In one or more embodiments, generating the one or more polyhedral geofences may include expanding the one or more polyhedrons based on a safe proximity distance. The safe proximity distance may be configured to provide a safe distance for the vehicle to move therefrom.

DETAILED DESCRIPTION OF EXEMPLARY EMBODIMENTS

Figure 1:
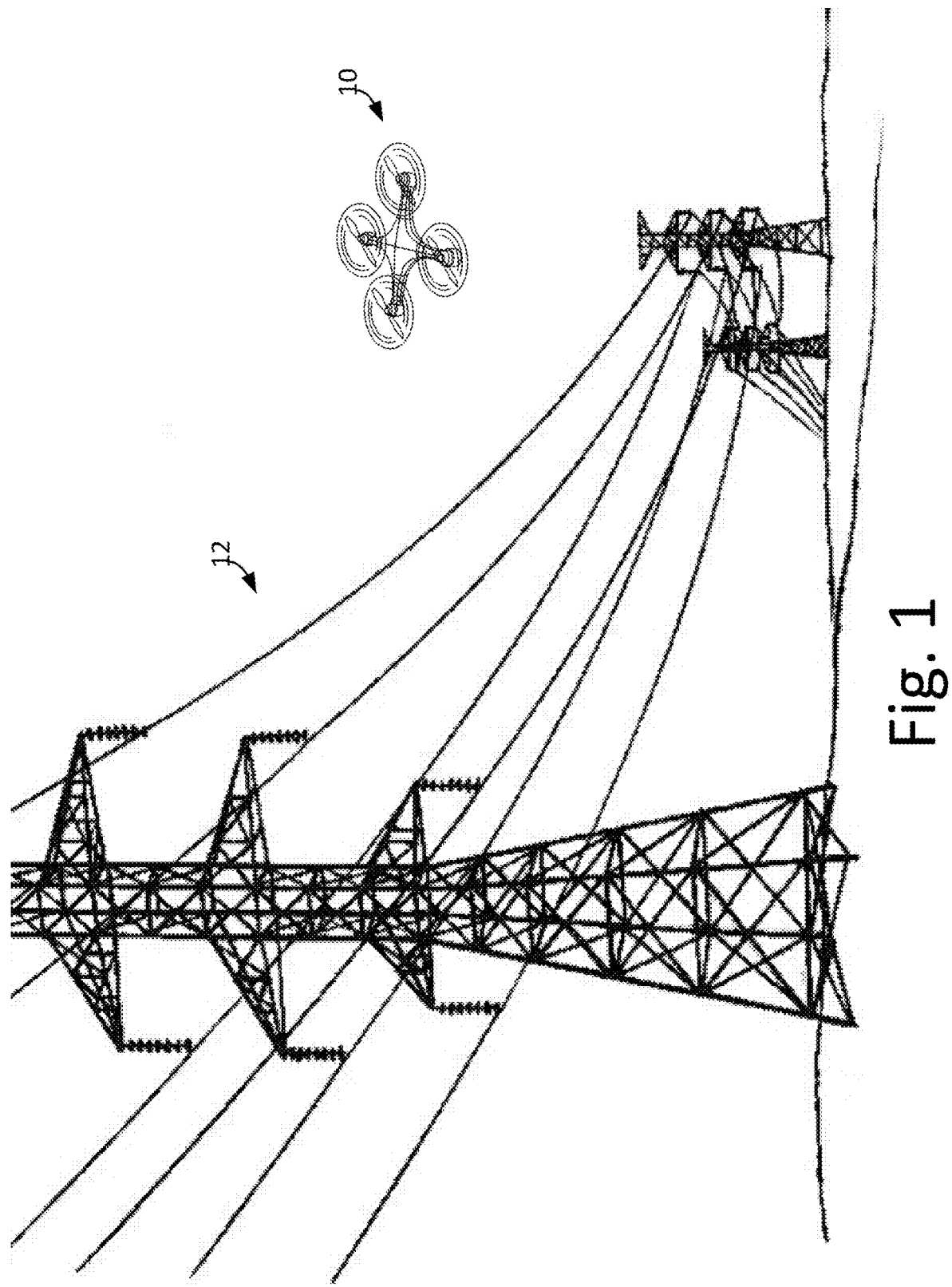
FIG. 1 is an example of a vehicle flying to inspect an object.

Exemplary methods, apparatus, and systems shall be described with reference to FIGS. 1-19. It will be apparent to one skilled in the art that elements or processes from one embodiment may be used in combination with elements or processes of the other embodiments, and that the possible embodiments of such methods, apparatus, and systems using combinations of features set forth herein is not limited to the specific embodiments shown in the Figures and/or described herein. Further, it will be recognized that the embodiments described herein may include many elements that are not necessarily shown to scale. Still further, it will be recognized that timing of the processes and the size and shape of various elements herein may be modified but still fall within the scope of the present disclosure, although certain timings, one or more shapes and/or sizes, or types of elements, may be advantageous over others.

It may be described that the present disclosure includes point-cloud data (e.g., lidar data) generated polyhedral geofences. The term "engine" used herein may be used interchangeably with motor. The disclosure herein will use the terms "2.5D polyhedral geofence" and "3D polyhedral geofence." It is to be understood as used herein 2.5D polyhedral geofence may include one or more polyhedrons each having coordinates mapped to one or more structures where altitude of the structure is represented by a single value (e.g., maximum altitude, height of a rooftop, etc.) and the polygonal area of the structure is projected from the altitude value to the ground to generate the one or more polyhedrons. A 2.5D polyhedral geofence, while compact, may not depict features such as tunnels, overhangs on buildings, and open areas under tree canopies. Such features may be represented by 3D polyhedral geofences. A 3D polyhedral geofence may include one or more polyhedrons each having coordinates mapped to a structure and defined by a polyhedral volume. The disclosure herein will use the term "2.5D polyhedron." It is to be understood as used herein, a 2.5D polyhedron may include a surface extruded along a third dimension, e.g., from the ground upwards.

The disclosure herein will use the term point cloud data and point cloud coordinated data (which may be used interchangeably) that refers to any plurality of 3D points to map, or define, one or more objects, and such objects relative position to one another. The disclosure herein will use the terms "lidar," "lidar data," and "lidar-data." It is to be understood as used herein, lidar refers to a surveying method used to measure distances with pulsed light. It is to be understood as used herein, lidar data and lidar-data refer to lidar points including attributes such as georeferenced or vehicle-referenced x, y, z coordinates, intensity, return number, number of returns, etc. Lidar data may be considered to be an example, or a species, of point cloud data.

For brevity, the term sGPS indicates standalone (single-ended) GPS and the term dGPS indicates differential GPS in this disclosure. The term "unipath" indicates "free of multipath interference."

An exemplary vehicle 10 for use in inspecting infrastructure 12 as described herein is depicted in FIG. 1. Vehicle 10 may include a processing apparatus, or a processor, imaging apparatus, sensors, propulsion devices, positioning systems, etc. Small, unmanned aerial vehicles (UAVs), such as vehicle 10, may be used to inspect and navigate (including, e.g., autonomous inspection and navigation) near ground structures such as infrastructure 12. It is to be understood that the illustrative methods, processes, and algorithms described herein may be used within any type, or kind, of vehicles such as e.g., flying vehicles such as drones, helicopters, and airplanes, ground vehicles such as automobiles and motorcycles, amphibious vehicles such as submarines and ships, etc. The ability to determine the spatial position of UAVs accurately (e.g., within a decimeter) near ground structures can be challenging. Single-ended global position system (sGPS) may be used to determine position by sensing orbital GPS satellite signals with an antenna mounted on the UAV. At altitudes above ground structures, sGPS commonly has a unipath positional uncertainty of, e.g., +−2 meters horizontally and +−3 meters vertically with about 95% confidence. The sGPS signal received by the UAV antenna may be compared with a second signal received from a GPS antenna mounted at a fixed, surveyed position. This comparison provides a differential GPS (dGPS) measurement. The dGPS measurement may be computed with a much smaller positional uncertainty (e.g., +−4 cm or better horizontally and vertically). Transmission of the signal between vehicle 10 and the fixed position may be accomplished via a cable (e.g., if vehicle 10 is ground based) or radio link (e.g., if vehicle 10 is an aerial vehicle).

If vehicle 10 is positioned at low altitude (e.g., below treetops and/or rooftops), the GPS antenna of vehicle 10 may receive satellite signals along more than one path. GPS signals can be received via a direct (in other words, line of sight) path from the satellites and one or more non-direct paths reflected from the terrain and ground structures (e.g., multipath signals). Current sGPS processing methods can reject a second signal that arises from flat terrain reflection. If the reflecting signals are not rejected, extraneous reflected multipath orbital signals can cause errors that are interpreted as a position shift. sGPS position shifts equal to or higher than the about 95% confidence may be common at low altitude near vegetation and structures.

Differential measurements may not improve position determination in a multipath environment. Further, the radio link between GPS receiver units in an air-ground dGPS system may be subject to multipath degradation. Multipath degradation may lead to loss of differential lock and enhanced location precision. Radio signals between GPS receiver units may traverse non-direct paths reflected from the terrain and ground structures, etc.

Other navigational methods pose additional problems for UAVs such as vehicle 10. Inertial sensors (e.g., gyroscopes, accelerometers, etc.) may drift over time and may be unreliable for position determination after a short time. Ranging with visual sensors may be prone to false readings and unreliable accuracy without a high quality, high resolution image sensor used in a uniformly illuminated scene. Ranging with lidar and sonar at high resolution may not be practical on UAVs such as vehicle 10. For example, UAVs may be limited to sparse spatial sampling that may be prone to false readings due to their small size and power constraints.

In concert with autonomous path correction capability, compact obstacle demarcation with lidar-data generated polyhedral geofences described herein may be described for providing means to avoid obstacles in real time at the cost of precomputing the geofences. High-precision lidar maps of transmission lines and other structures may provide too much data to use in real-time given current processing power constraints. Using lidar-generated polyhedral geofences may be described as simplifying the high-precision lidar maps while retaining the precision of the high-precision lidar maps. As an input to onboard navigation software, lidar-data generated polyhedral geofences may allow vehicle 10 to inspect structures such as buildings, bridges, and power lines safely and effectively.

Additionally, lidar-data generated polyhedral geofences may allow for techniques to determine the position of vehicle 10 (e.g., latitude, longitude, and altitude) more precisely and resiliently than sGPS or dGPS at low altitudes near ground structures. Position determination via radio, image processing (e.g., stereo ranging, triangulation from image recognition of nearby features) may exceed sGPS positioning accuracy near structures. The polyhedral representation of structures (such as, e.g., ground structures) from lidar-data generated polyhedral geofences can serve as an input to image recognition software. Additionally, by comparing polyhedrons constructed, or computed, from on-the-fly lidar sensor inputs with precomputed polyhedrons of known structures, a geographical fix, or coordinate location, can be determined. As polyhedrons may be described as being less complex than images and do not vary with the variation of natural lighting at different times of day, polyhedral comparison may be faster and more robust than general image comparison.

Collision avoidance methods suitable for execution in real time on small UAVS are capable of reading the position and velocity of the UAV and calculating a spatial envelope around the UAV that must be obstacle-free to avoid collision with the obstacles. However, given current computer hardware, these collision avoidance software programs are often limited in the amount of data they can process to determine obstacle location rapidly (e.g., in one second or less). Due to their high data volume, high fidelity lidar point clouds of terrain and structures may not be suitable for a compact representation of an obstacle field. For example, a contemporary high-fidelity lidar point cloud with 4 centimeters (cm) horizontal resolution and precision of 0.5 meters contains tens of millions of individual lidar points in each square mile of ground area (after points along the ground are removed). Geometric simplification of the boundaries of obstacle surfaces may be used for sufficiently rapid (e.g., one second or less) processing by contemporary collision avoidance methods running on compact airborne-hardware.

Lidar sensors mounted on the vehicle 10 may be suitable for acquiring a lidar point cloud used to determine obstacle boundaries if two constraints are accepted. First, vehicle-centric rather than georeferenced obstacles must be used. An accurate georeferenced registration of the point cloud requires accurate spatial determination of the vehicle 10 position, and, as described previously, electromagnetic scattering by the structures 12 may prevent precise determination of the vehicle 10 position. Secondly, low-power lidar sensor/processor payloads must map out obstacles in a way that is suitable for obstacle avoidance in real time (e.g., one second or less). Time lags from point cloud acquisition and processing the point cloud data into vehicle-referenced polyhedrons must fall at or under a threshold time (e.g., one second or less) to be suitable for obstacle avoidance in real time.

Figure 2:
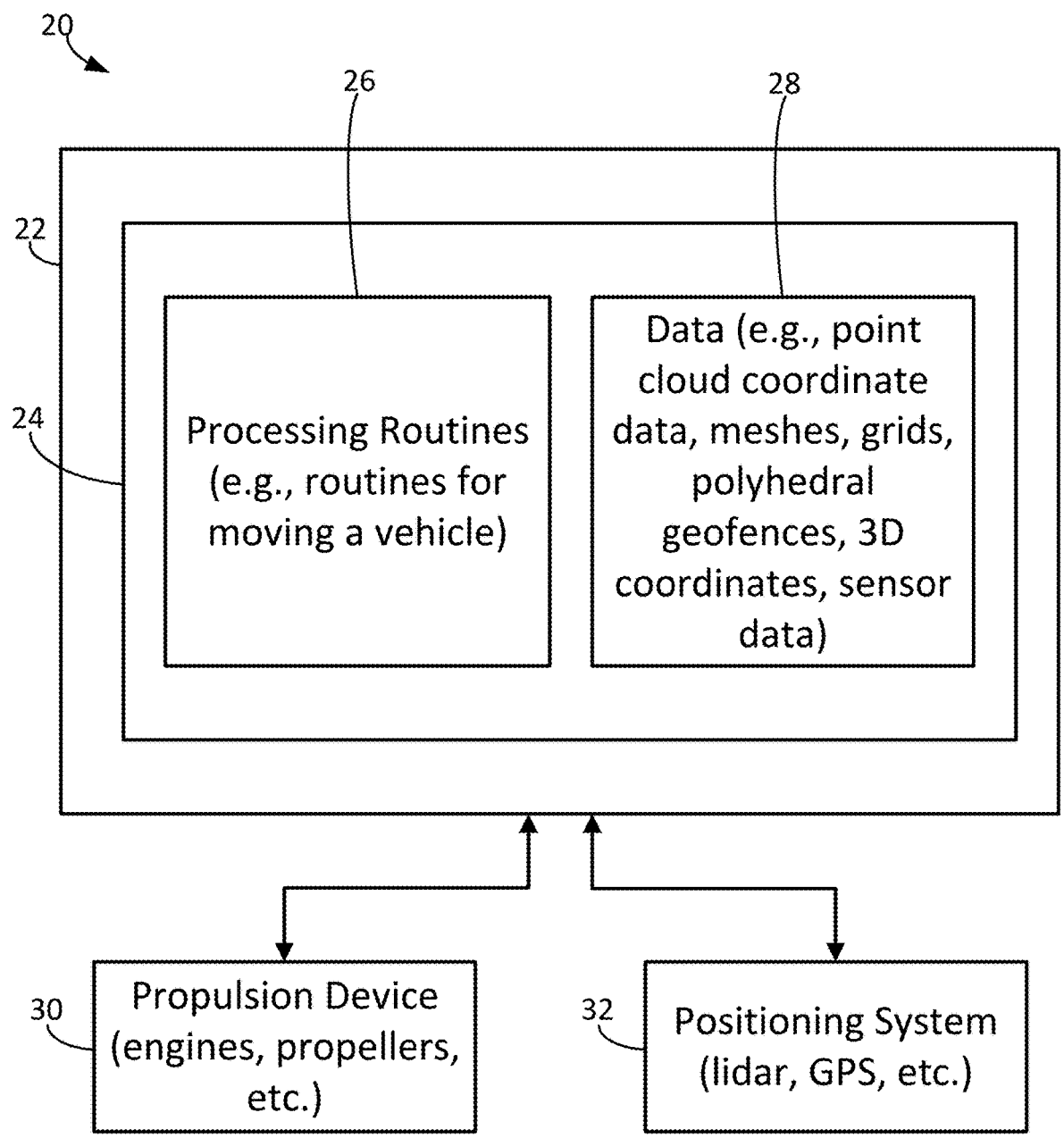
FIG. 2 is a block diagram of an illustrative vehicle that moves based on a polyhedral geofence.

A functional block diagram of an exemplary vehicle 20 for use in inspecting and navigating structures as described herein is depicted in FIG. 2. The vehicle 20 may include a processing apparatus, or a processor, 22 and propulsion device 30. Generally, the propulsion device 30 may be operably coupled to the processing apparatus 22 and may include any one or more devices configured to provide propulsion to the processing apparatus 22. The propulsion device 30 may include any apparatus, structure, or devices configured to convert energy into a propulsive force. For example, the propulsion device 30 may include one or more engines, propellers, wheels, tread, rockets, fins, etc.

Additionally, the propulsion device 30 may be further described in terms of the various propulsion modalities. For example, the propulsion device 30 may be configured to propel vehicle 20 on land, across a surface, through a fluid, in air, in water, in space, etc. In essence, the propulsion device 30 may be configured to provide propulsion in various locations, mediums, and conditions to, e.g., inspect and navigate structures. In one or more embodiments, the processing apparatus 22 flies the vehicle within a selected inspection distance from one or more objects (e.g., ground-based structures, etc.) for inspection. The selected inspection distance may extend from about 0 meters (m) to about 100 m. In at least one embodiment, the selected inspection distance is about 6 m. The processing apparatus 22 may fly, or control the flight of, the vehicle 20 to collect inspection data from the one or more objects. Further, the processing apparatus 22 may fly, or control the flight of, the vehicle 20 to detect a defect in one or more objects, e.g., at the selected inspection distance away from the one or more objects.

The vehicle 20 may additionally include a positioning system 32 operably coupled to the processing apparatus 22. Generally, the positioning system 32 may include any one or more devices configured to provide position information (e.g., 3D position data, xyx position data, latitude data, longitudinal data, altitude data, etc.) of the vehicle 20 to the processing apparatus 22. The positioning system 32 may include any apparatus, structure, or devices configured to receive and/or determine position data of the vehicle 20. For example, the positioning system 32 may include one or more antennas, receivers, transmitters, emitters, sensors, processors, imaging devices, waveguides, etc.

Additionally, the positioning system 32 may be further described in terms of the various positioning determination modalities. For example, the positioning system 32 may be configured to determine position data of the vehicle 20 using lidar, GPS, radar, radio, sonar, image parallax, stereo imaging, photon time of flight, acoustic time of flight, radioactive decay time, material phase change (e.g., fluorescent, phosphorescent, etc.), scintillation, temperature change, etc. In one or more embodiments, the positioning system 32 may be configured to receive and determine position data of vehicle 20 to e.g., inspect and navigate structures.

The position information, or position data, sensed or received by the positioning system 32 may be provided to the processing apparatus 22, e.g., such that the processing apparatus 22 may compare the position information to a point-cloud data generated geofence such as, e.g., a lidar-data generated geofence. Further, such position information may be provided to the processing apparatus 22 in a variety of different ways. For example, the position information may be transferred to the processing apparatus 22 through a wired or wireless data connection between the processing apparatus 22 and the positioning system 32.

Additionally, the position information from the positioning system 32 may be transferred, and then analyzed by, the processing apparatus 22 at any time. For example, the position information may be transferred to the processing apparatus 22 as soon as the position information is sensed or received such that the processing apparatus 22 can analyze the position information and compare the position information to the lidar-generated polyhedral geofence in or close to "real time."

Further, the processing apparatus 22 includes data storage 24. Data storage 24 allows for access to processing programs or routines 26 and one or more other types of data 28 that may be employed to carry out the exemplary methods, processes, and algorithms of using a point cloud data generated polyhedral geofence. For example, processing programs or routines 26 may include programs or routines for performing computational mathematics, matrix mathematics, Fourier transforms, image registration processes, compression algorithms, calibration algorithms, image construction algorithms, inversion algorithms, signal processing algorithms, normalizing algorithms, deconvolution algorithms, averaging algorithms, standardization algorithms, comparison algorithms, vector mathematics, inspecting structures, gathering inspection data, avoiding objects, detecting defects, learning algorithms, biomimetic computation, autonomous navigation computation, or any other processing required to implement one or more embodiments as described herein.

Data 28 may include, for example, point cloud coordinate data (e.g., lidar data, etc.), polyhedral geofences (e.g., lidar-data generated polyhedral geofences, etc.), positional data captured by positioning system 32, arrays, meshes, grids, variables, counters, statistical estimations of accuracy of results, results from one or more processing programs or routines employed according to the disclosure herein (e.g., polyhedral representations of objects or structures), or any other data that may be necessary for carrying out the one or more processes or methods described herein.

In one or more embodiments, the vehicle 20 may be controlled using one or more computer programs executed on programmable computers, such as computers that include, for example, processing capabilities (e.g., microcontrollers, programmable logic devices, etc.), data storage (e.g., volatile or non-volatile memory and/or storage elements), input devices, and output devices. Program code and/or logic described herein may be applied to input data to perform functionality described herein and generate desired output information. The output information may be applied as input to one or more other devices and/or processes as described herein or as would be applied in a known fashion.

The programs used to implement the processes described herein may be provided using any programmable language, e.g., a high level procedural and/or object orientated programming language that is suitable for communicating with a computer system. Any such programs may, for example, be stored on any suitable device, e.g., a storage media, readable by a general or special purpose program, computer or a processor apparatus for configuring and operating the computer when the suitable device is read for performing the procedures described herein. In other words, at least in one embodiment, the vehicle 20 may be controlled using a computer readable storage medium, configured with a computer program, where the storage medium so configured causes the computer to operate in a specific and predefined manner to perform functions described herein.

The processing apparatus 22 may be, for example, any fixed or mobile computer system (e.g., a personal computer or minicomputer). The exact configuration of the computing apparatus is not limiting and essentially any device capable of providing suitable computing capabilities and control capabilities (e.g., control the movement of the vehicle 20, the acquisition of data, such as position or distance data) may be used. Further, various peripheral devices, such as a computer display, mouse, keyboard, memory, printer, scanner, etc. are contemplated to be used in combination with the processing apparatus 22. Further, in one or more embodiments, the data 28 (e.g., point cloud coordinate data, polyhedral geofence, image data, an image data file, an array, a mesh, a high-resolution grid, a digital file, a file in user-readable format, coordinate data, etc.) may be analyzed by a user, used by another machine that provides output based thereon, etc. As described herein, a digital file may be any medium (e.g., volatile or non-volatile memory, a CD-ROM, a punch card, magnetic recordable tape, etc.) containing digital bits (e.g., encoded in binary, trinary, etc.) that may be readable and/or writeable by processing apparatus 22 described herein. Also, as described herein, a file in user-readable format may be any representation of data (e.g., ASCII text, binary numbers, hexadecimal numbers, decimal numbers, audio, graphical) presentable on any medium (e.g., paper, a display, sound waves, etc.) readable and/or understandable by a user.

In view of the above, it will be readily apparent that the functionality as described in one or more embodiments according to the present disclosure may be implemented in any manner as would be known to one skilled in the art. As such, the computer language, the computer system, or any other software/hardware that is to be used to implement the processes described herein shall not be limiting on the scope of the systems, processes or programs (e.g., the functionality provided by such systems, processes or programs) described herein.

The methods described in this disclosure, including those attributed to the systems, or various constituent components, may be implemented, at least in part, in hardware, software, firmware, or any combination thereof. For example, various aspects of the techniques may be implemented by the processing apparatus 22, which may use one or more processors such as, e.g., one or more microprocessors, DSPs, ASICs, FPGAs, CPLDs, microcontrollers, or any other equivalent integrated or discrete logic circuitry, as well as any combinations of such components, image processing devices, or other devices. The term "processing apparatus," "processor," or "processing circuitry" may generally refer to any of the foregoing logic circuitry, alone or in combination with other logic circuitry, or any other equivalent circuitry. Additionally, the use of the word "processor" may not be limited to the use of a single processor but is intended to connote that at least one processor may be used to perform the exemplary methods and processes described herein.

Such hardware, software, and/or firmware may be implemented within the same device or within separate devices to support the various operations and functions described in this disclosure. In addition, any of the described components may be implemented together or separately as discrete but interoperable logic devices. Depiction of different features, e.g., using block diagrams, etc., is intended to highlight different functional aspects and does not necessarily imply that such features must be realized by separate hardware or software components. Rather, functionality may be performed by separate hardware or software components, or integrated within common or separate hardware or software components.

When implemented in software, the functionality ascribed to the systems, devices and methods described in this disclosure may be embodied as instructions on a computer-readable medium such as RAM, ROM, NVRAM, EEPROM, FLASH memory, magnetic data storage media, optical data storage media, or the like. The instructions may be executed by the processing apparatus 22 to support one or more aspects of the functionality described in this disclosure.

Figure 3:
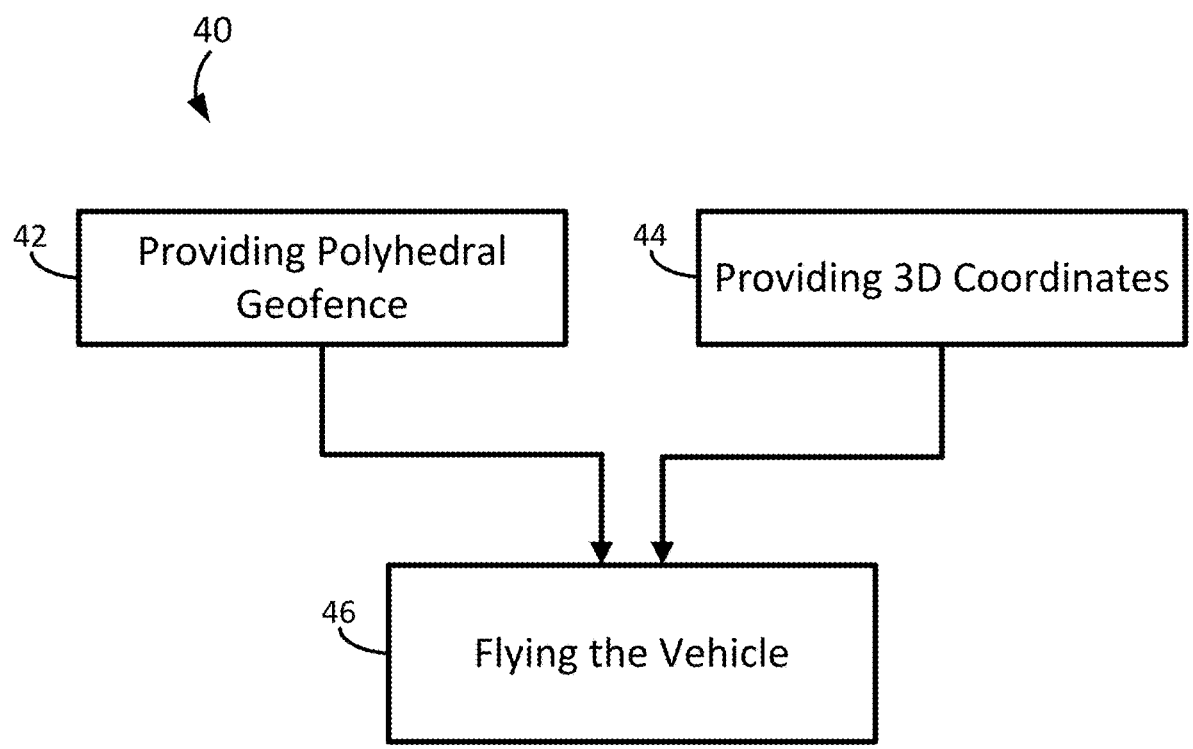
FIG. 3 is a flow diagram of an illustrative method, or process, for moving a vehicle based on a polyhedral geofence.

FIG. 3 is a flow diagram of an illustrative method, or process, 40 for flying, or controlling the flight of, a vehicle. The method 40 may include providing a polyhedral geofence 42 and flying, or controlling the flight of, the vehicle 46 based on the provided lidar-generated polyhedral geofence 42. The lidar-data polyhedral geofence may be a 2.5D or 3D polyhedral geofence. For example, the vehicle may be flown using a propulsion device to avoid coordinates within the polyhedral geofence. Further, for example, a flight path may be determined based on the provided lidar-data generated polyhedral geofence 42. Although this example controls the flight a vehicle (e.g., in the case of an aerial vehicle), it is to be understood that the illustrative methods, processes, and algorithms described herein may be used within other types, or kinds, of vehicles such as e.g., ground vehicles such as automobiles and motorcycles, amphibious vehicles such as submarines and ships, etc.

In one or more embodiments, flying the vehicle 46 may be further based on at least determined three-dimensional coordinates. The method 40 may further include providing three-dimensional coordinates 44. The three-dimensional coordinates 44 may be received via a GPS antenna, a lidar sensor system, a wireless communication device, etc. The three-dimensional coordinates may be GPS coordinates, Universal Transverse Mercator (UTM), or other georeferenced coordinates. In at least one embodiment, the three-dimensional coordinates may include longitude, latitude, and altitude. The three-dimensional coordinates may be compared to the lidar-data generated polyhedral geofence. A flight path of the vehicle may be altered or changed, based on the comparison of the three-dimensional coordinates to the lidar-data generated polyhedral geofence. For example, if the three-dimensional coordinates indicate that the vehicle is too close to an object defined by the lidar-data generated polyhedral geofence, then the flight path of the vehicle may be altered or changed to avoid the object defined by the lidar-data generated polyhedral geofence.

Figure 4:
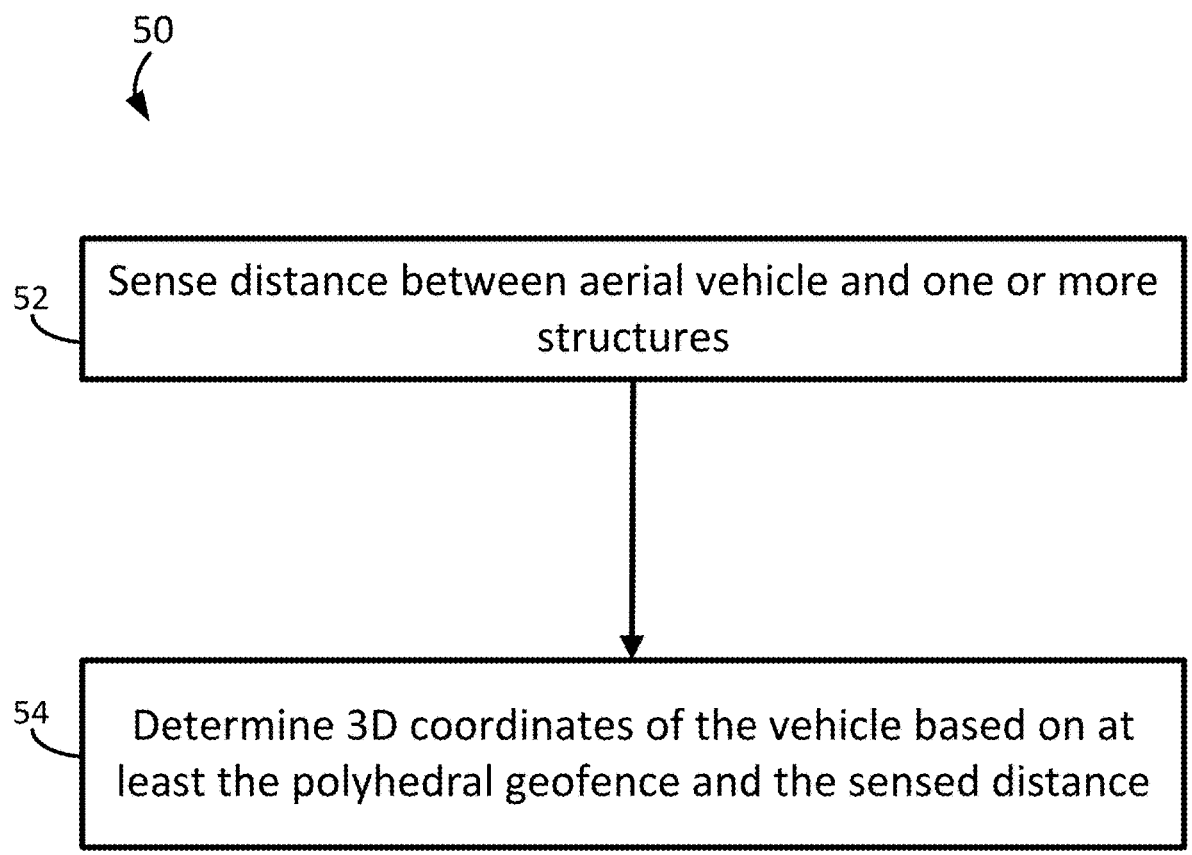
FIG. 4 is a flow diagram of an illustrative method, or process, for determining three-dimensional coordinates based on distance to one or more structures and a polyhedral geofence.

FIG. 4 is a flow diagram of an illustrative method, or process, 50 for determining three-dimensional coordinates based on distance to one or more structures and a polyhedral geofence. At step 52, a distance may be sensed between the aerial vehicle and one or more structures.

In one example, distance may be sensed using a lidar sensor system, photogrammetry, sonar, or other range sensing systems and/or methods. Distance may be represented in a plurality of different ways. Distance may be represented by an angle and distance from the vehicle, three-dimensional coordinates, etc. The three-dimensional coordinates determined based on the sensed distance may be GPS coordinates, Universal Transverse Mercator (UTM), or other georeferenced coordinates.

At step 54, the three-dimensional coordinates of the vehicle may be determined based on at least the lidar-data generated polyhedral geofence and the distance between the aerial vehicle and the one or more structures. In some embodiments, distances sensed may be converted to one or more polyhedrons mapped to georeferenced coordinates. The distances may be converted by the vehicle on-board the vehicle or transmitted to a computing device for conversion. The polyhedrons may be compared to the lidar-data generated polyhedral geofence to determine the three-dimensional coordinates. In other words, the distance data may be used by comparing the distance data to the polyhedral geofence, and if the distance corresponds to an expected object, or expected objects, based on the polyhedral geofence, then the position (e.g., 3D position) of the vehicle may be determined based on such comparison.

Figure 5:
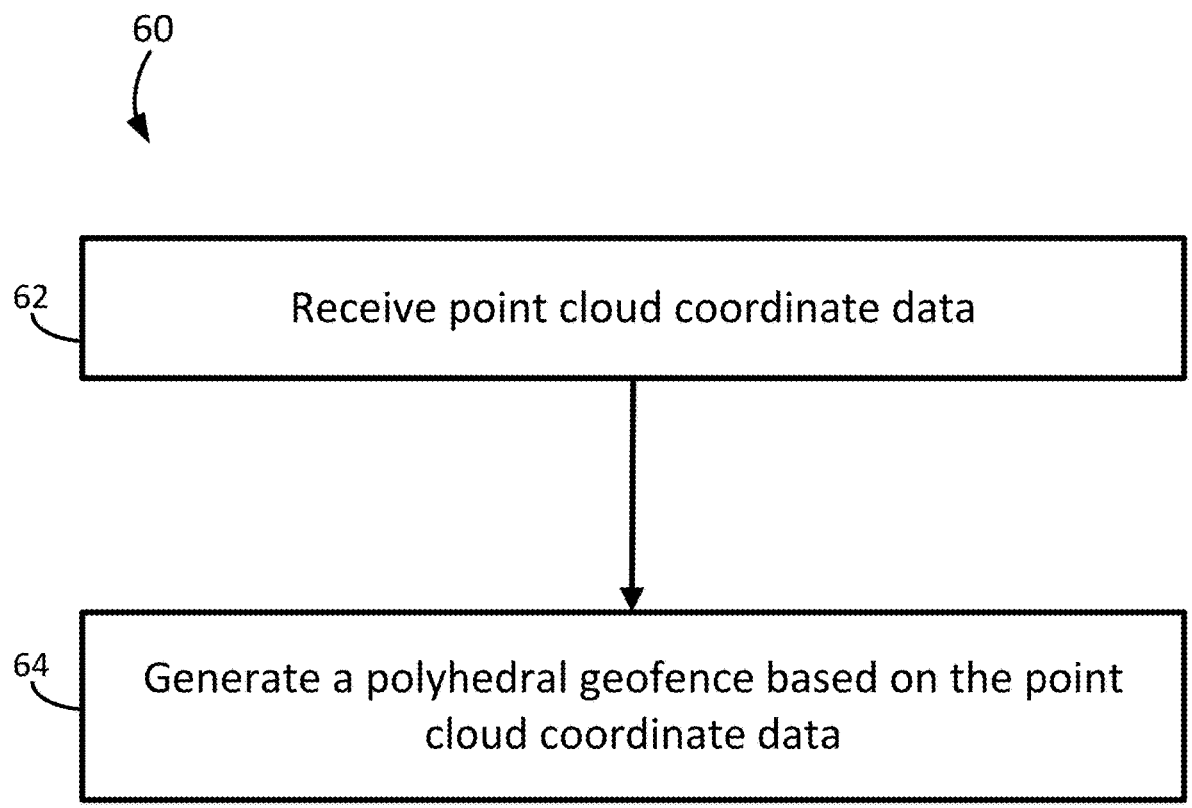
FIG. 5 is a flow diagram of an illustrative method, or process, for generating a polyhedral geofence from point cloud coordinate data such as lidar data.

FIG. 5 is a flow diagram of a process 60 for generating a polyhedral geofence from point cloud coordinate data. At step 62, point cloud coordinate data is received (e.g., lidar data, photogrammetry data, etc.). In one or more embodiments, the point cloud coordinate data may be received from various known sources such as, e.g., Open Topography, LIDAR Online, National Ecological Observatory Network, LIDAR Online, etc. and/or directly from aerial vehicles, repositories (e.g., personal, corporate, government, etc.), satellites, ground-based survey, etc. For example, lidar data may be received via internet connections, wireless or wired data transfer, etc. from a known source or directly from, e.g., aerial vehicles.

At step 64, a polyhedral geofence is generated based on the lidar data. The lidar-data generated polyhedral geofence may be a 2.5D polyhedral geofence, a 3D polyhedral geofence, or a combination of both. It should be understood that methods for generating a polyhedral geofence from point cloud coordinate data can apply to any point cloud coordinate data such as lidar, photogrammetry data, sonar data, mesh data, Point Cloud Library (PCL) data, etc.

Figure 6:
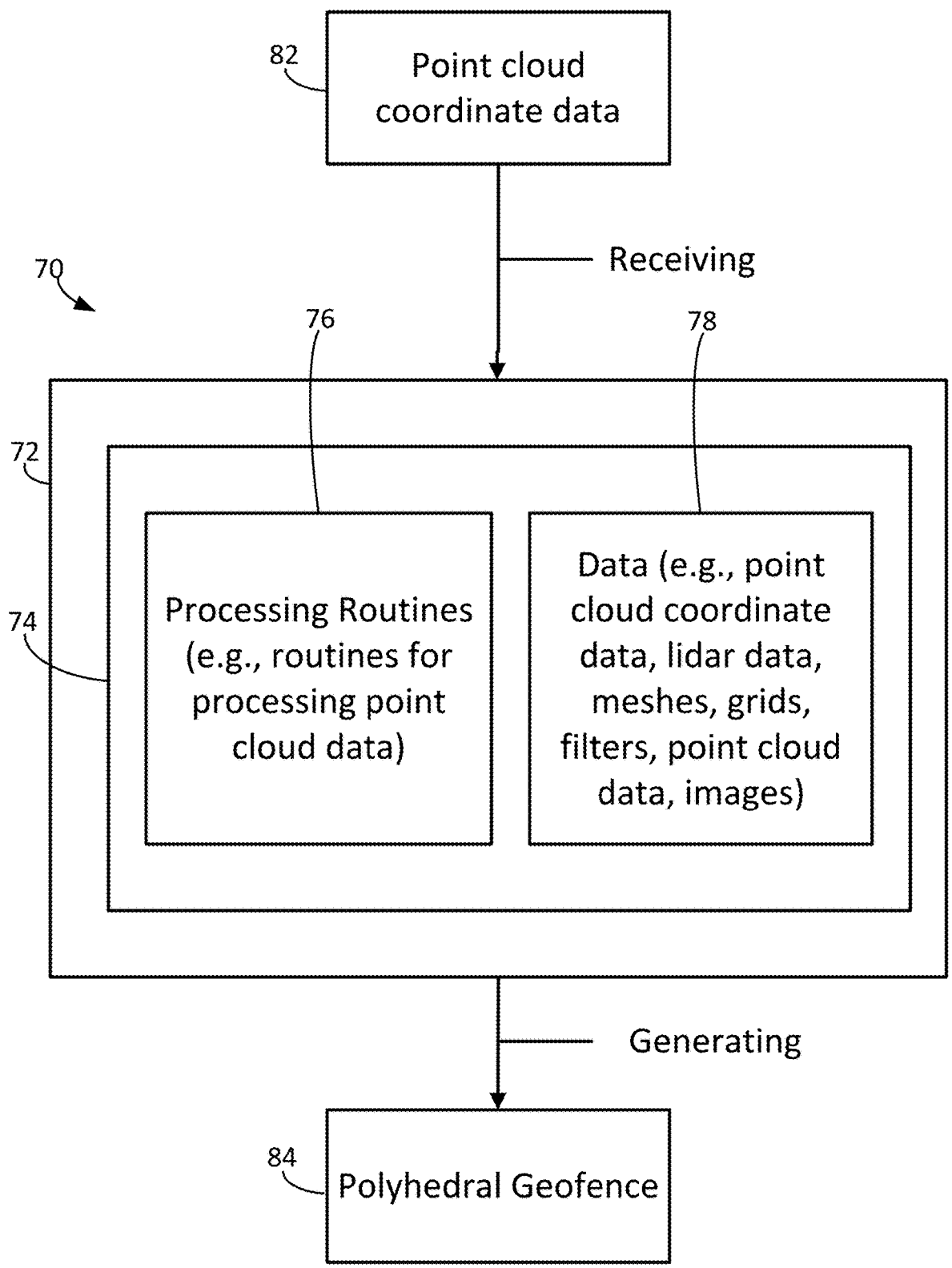
FIG. 6 is a block diagram of an illustrative system for generating a polyhedral geofence from point cloud data.

An exemplary system 70 for generating a polyhedral geofence 84 for use by a vehicle is depicted in FIG. 6. The system 70 may include a processing apparatus, or a processor, 72. The system 70 receives point cloud coordinate data 82 and generates the polyhedral geofence 84 (e.g., lidar-data generated polyhedral geofence, etc.) based on the point cloud coordinate data 82. In other words, the system 70 may receive point cloud coordinate data as input and may generate the polyhedral geofence 84 as output. It should be understood that system 70 for generating a polyhedral geofence from point cloud coordinate data can be used to generate the polyhedral geofence 84 based on any point cloud coordinate data such as lidar, photogrammetry data, sonar data, mesh data, Point Cloud Library (PCL) data, etc.

Further, the processing apparatus 72 includes data storage 74. Data storage 74 allows for access to processing programs or routines 76 and one or more other types of data 78 that may be employed to carry out the exemplary system 70 for generating polyhedral geofences. For example, processing programs or routines 76 may include similar programs or routines as described herein with respect to processing programs or routines 26 described herein with reference to FIG. 2 or any other processing required to implement one or more embodiments as described herein.

Data 78 may include, for example, point cloud coordinate data 82, polyhedral geofences 84, positional data, arrays, meshes, grids, variables, counters, statistical estimations of accuracy of results, results from one or more processing programs or routines employed according to the disclosure herein (e.g., polyhedral representation of objects or structures), spline, polynomial or other parametric representations, or any other data that may be necessary for carrying out the one or more processes or methods described herein. In one or more embodiments, the system 70 may be controlled using one or more computer programs executed on programmable computers, such as previously described herein with respect to the system 20 of FIG. 2.

Figure 8:
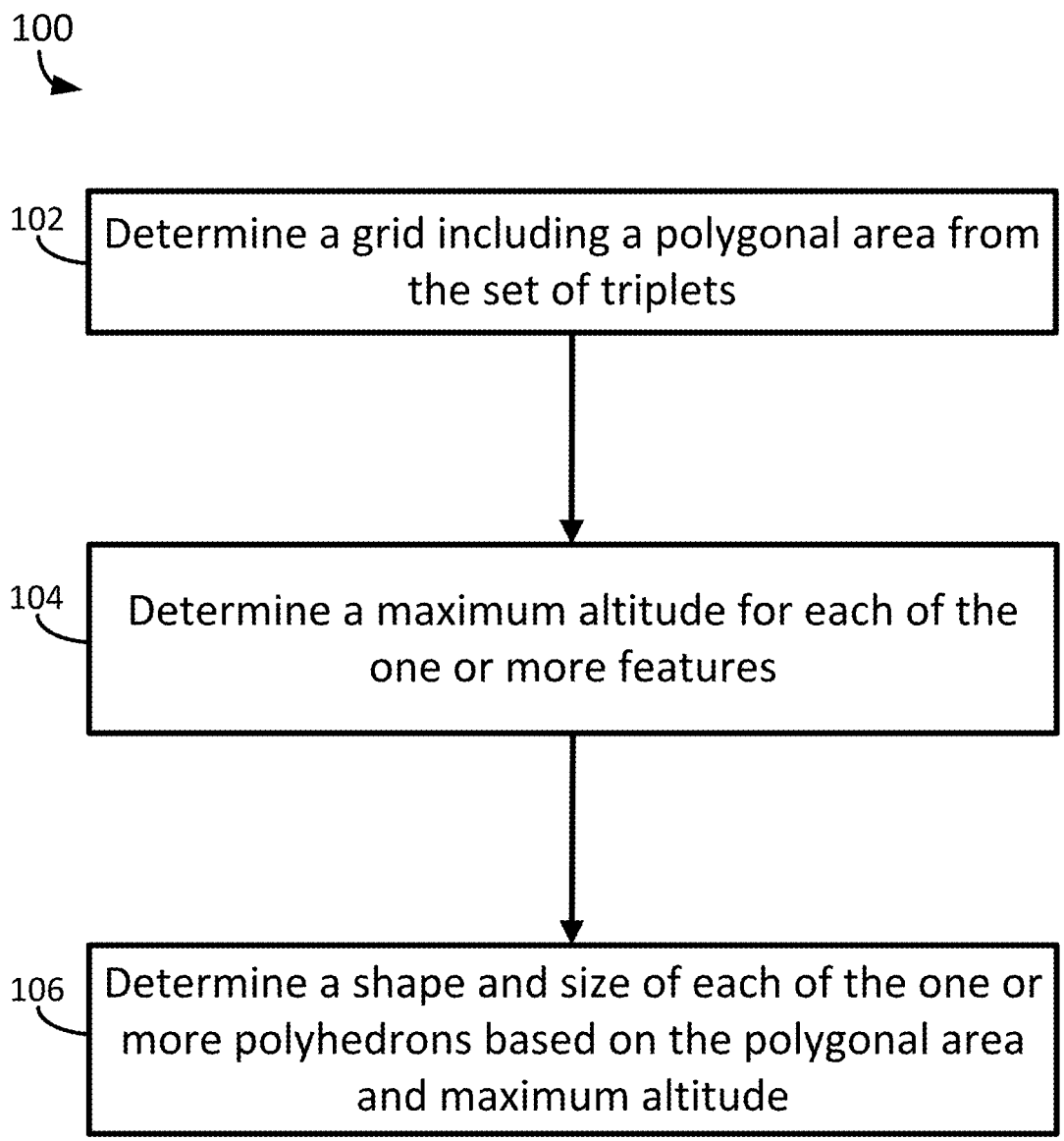
FIG. 8 is a flow diagram of an illustrative process for generating a 2.5-dimensional (2.5D) polyhedral geofence from point cloud data.
Figure 9:
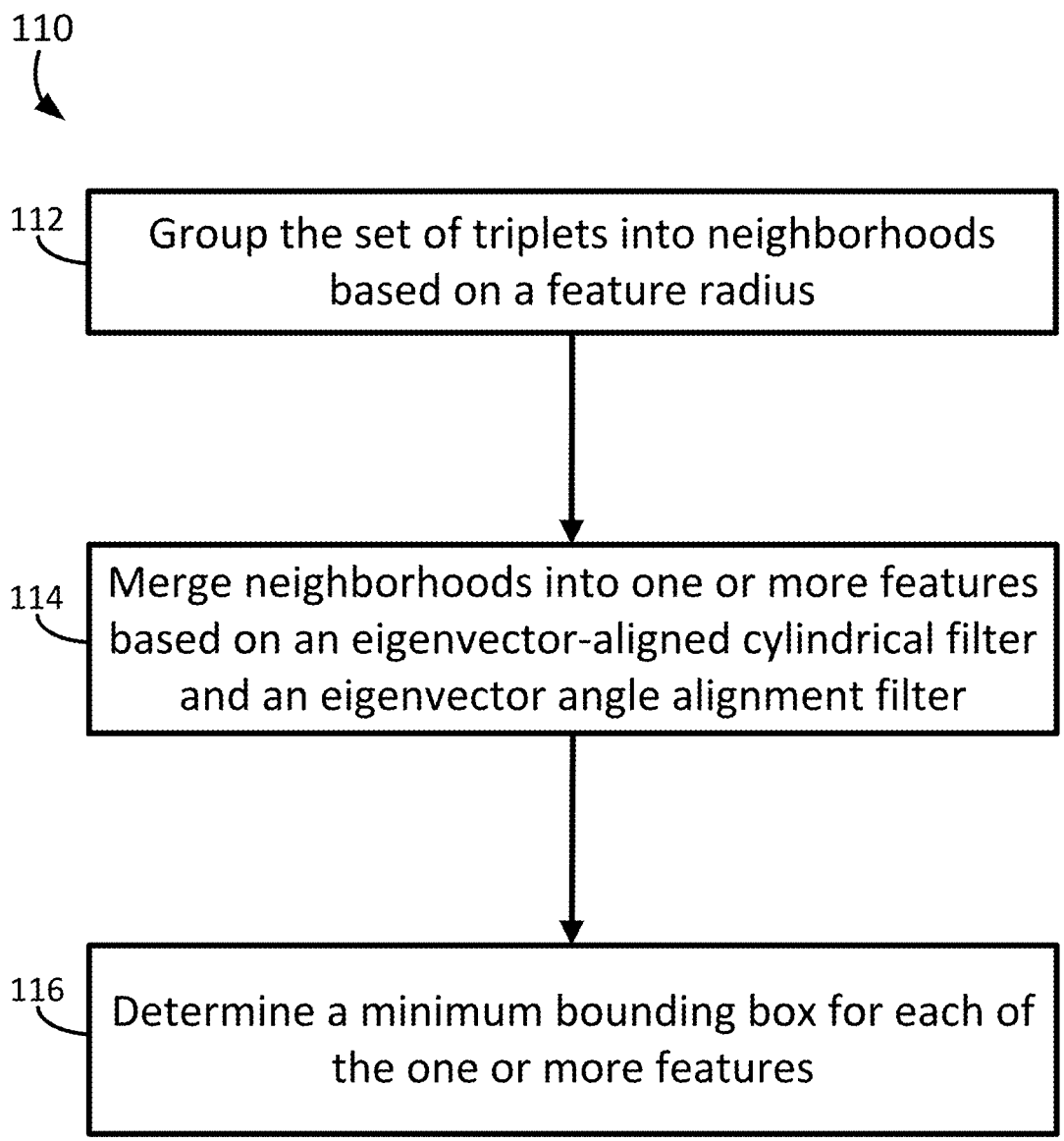
FIG. 9 is a flow diagram of an illustrative process for generating a 3-dimensional (3D) polyhedral geofence from point cloud data.

There are multiple ways to generate polyhedral geofences from point cloud coordinate data. Additionally, multiple different types of polyhedral geofences may be generated, or created, using the illustrative embodiments described herein. For example, a 2.5D and 3D polyhedral geofence may be generated from point cloud coordinate data as shown by the methods of FIGS. 7-9.

Figure 7:
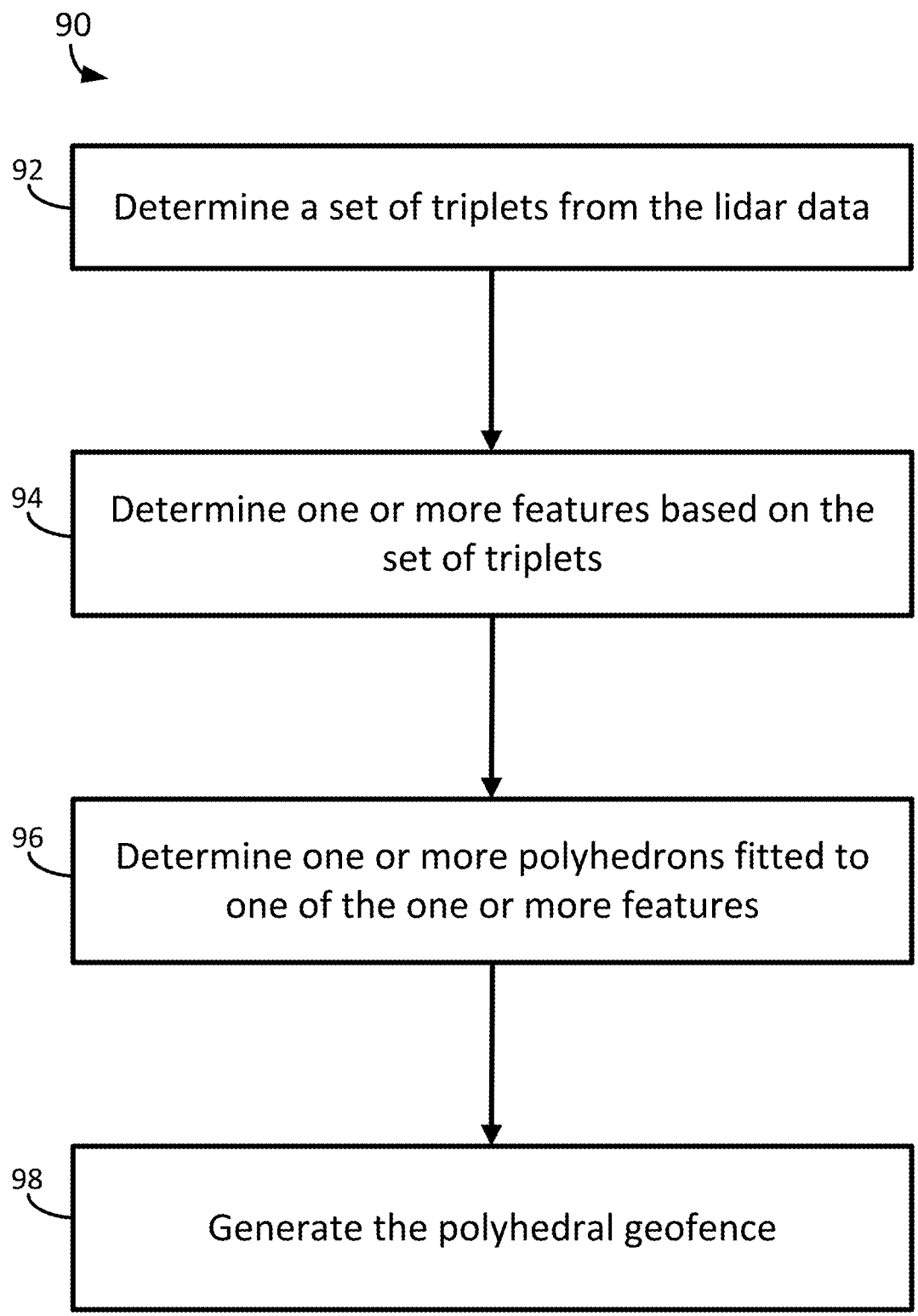
FIG. 7 is a flow diagram of an illustrative process for generating a polyhedral geofence from point cloud data such as lidar data.

FIG. 7 is a flow diagram of a process 90 for generating a polyhedral geofence from point cloud coordinate data such as lidar data. At step 92, a set of triplets may be determined from point cloud coordinate data. The set of triplets may be extracted from the point cloud coordinate data. Triplets may represent a latitude, longitude, and altitude of a point on a structure. Point cloud data may include data that is not latitude, longitude, and latitude such as pulse duration, pulse count, pulse angle, vehicle coordinates, etc. Extracting triplets from point cloud data may allow processing of the data without processing data that is not needed to generate polyhedral geofences.

The point cloud coordinate data may be converted to sets of triplets in various ways. In one embodiment, a point cloud coordinate-to-raster may be performed on the point cloud coordinate data, and then a raster-to-xyz step may be performed on the raster data. Next, an xyz-to-latitude/longitude/altitude may be performed on the xyz data. It should be understood that a set of triplets may be determined from any suitable point cloud data including photogrammetry data, sonar data, mesh data, Point Cloud Library (PCL) data, etc.

At step 94, one or more features may be determined based on the set or sets of triplets. The one or more features may be determined based on one or more properties or features of the set or sets of triplets such as, e.g., feature spacing, feature radius, or other distance between each triplet of the set or sets of triplets. The one or more features may be determined based on 2.5D methods and/or 3D methods as will be further described in process 100 of FIG. 8 and process 110 of FIG. 9.

At step 96, one or more polyhedrons may be fitted to the one or more features. The one or more polyhedrons may be fitted based upon a minimum bounding box, a grid, a maximum altitude, or other coordinate data as will be further described in process 100 of FIG. 8 and process 110 of FIG. 9. Next, at step 98, the polyhedral geofence may be generated including the one or more polyhedrons. The polyhedrons may be 2.5D polyhedrons and/or 3D polyhedrons as will be further described in process 100 of FIG. 8 and process 110 of FIG. 9.

FIG. 8 is a flow diagram of a process 100 for generating a 2.5-dimensional (2.5D) polyhedral geofence from point cloud coordinate data. At step 102, a grid may be determined including a polygonal area from a set of triplets, for example, generated using the processes and techniques described herein with respect to FIG. 7. The set of triplets may be traversed (e.g., stepped through in a sequential manner and compared to one another, etc.) to generate the grid based on an effective grid spacing. For example, triplets within the effective grid spacing may be grouped into the grid. The set of triplets may be traversed first along lines of latitude and then along lines of longitude. The effective grid spacing may be based on a minimum feature spacing which may indicate that the triplets are part of the same structure, object, etc. In some embodiments, the minimum feature spacing is five decimal places in a decimal latitude and decimal longitude (e.g., approximately 0.01 meters of precision). The polygonal area of the grid can include any suitable size or take on any suitable shape. In one or more embodiments, multiple grids are determined from the set of triplets.

At step 104, a maximum altitude may be determined for a feature (e.g., object, structure, etc.) that may be defined by the grid. The maximum altitude of the feature may be determined as the set of triplets are traversed and may be the highest altitude of the triplets of the grid. Next, at step, 106, a shape and size of each of the one or more polyhedrons may be determined based on the polygonal area and maximum altitude. The one or more polyhedrons may include a polygonal area projected from the maximum altitude to, or from, the ground. Each of the polyhedrons may include, or be defined by, a latitude, a longitude, and an altitude (e.g., defining a box-like structure, fixed to a grid aligned along latitude and longitude, etc.). The one or more polyhedrons may be saved as a latitude/longitude/altitude geometry. Optionally, a copy of the one or more polyhedrons may be written to a file for visualization in a 3D map.

FIG. 9 is a flow diagram of a process 110 for generating a 3-dimensional (3D) polyhedral geofence from point cloud coordinate data. At step 112, the set of triplets may be grouped into neighborhoods based on a feature radius (e.g., a predetermined distance between nearby triplets, etc.). In at least one embodiment, the set of triplets may be converted to a 3D point processing software package with model-based clustering capabilities, such as a Point Cloud Library file.

Further, the triplets may be clustered using various different modeling techniques or processes. For example, for tubular structures, such as power lines, poles, and lattice towers, etc., cylindrical modeling may be appropriate. Further for example, for some structures, spherical modeling, elliptical modeling, manhattan (nearest x,y,z grid) modeling, radial basis function modeling, etc. may be appropriate.

Neighborhood groupings may be determined based on a selected nearest neighbor feature radius. In one or more embodiments, neighborhood groupings may be determined based on a 1-meter nearest neighbor feature radius. In this example, at step 114 neighborhoods may be merged into one or more features based on modeling such as, e.g., cylindrical modeling. Merging neighborhoods based on modeling may include using an eigenvector-aligned filter (e.g., eigenvector-aligned cylindrical filter) and an eigenvector angle alignment filter. In one embodiment, an eigenvector-aligned search (e.g., eigenvector-aligned cylindrical search) with 0.4 m radius may be utilized. Further, in such embodiment, an eigenvector difference in angle comparison looking for a difference less than 26 degrees may be used. Additionally, neighborhoods may be merged using proximity-based metrics. Each neighborhood may be assigned a label and output as a labeled point cloud data (PCD) file.

At step 116, a minimum bounding box may be computed for each of the one or more features. The minimum bounding box may be based on a safe proximity distance. The safe proximity distance may be configured to provide a safe distance for the vehicle to move from the object made up of the one or more features. The minimum bounding box for each of the labeled neighborhoods may be output as a text file, and the text file may be converted for visualization in a 3D map.

The following experiment is an illustrative embodiment and is not meant to be construed in a limiting sense.

Flights of UAVs at low altitudes in close proximity to electrical transmission infrastructure present serious navigational challenges. GPS and radio communication quality may be variable and tight position control is often needed to inspect defects while avoiding collisions with ground structures. To advance UAV navigation technology, a high-voltage electrical infrastructure inspection reference mission was designed. An integrated air-ground platform was developed for this mission and tested over two days of experimental flights to determine whether navigational augmentation was needed to successfully conduct a controlled inspection experiment. The airborne component of the platform was a multirotor UAV built from commercial off-the-shelf hardware and software, and the ground component was a commercial laptop running open source software. A compact ultraviolet sensor mounted on the UAV may be used to locate "hot spots" (e.g., potential failure points in the electric grid). To improve navigation, the UAV was supplemented with two navigation technologies. First, the UAV was provided with lidar-to-polyhedron preflight processing (e.g., lidar-data generated polyhedral geofence) for obstacle demarcation and inspection distance planning. Second, the UAV was provided with trajectory management software to enforce an inspection standoff distance. Both navigation technologies were used to obtain useful results from the hot spot sensor in this obstacle-rich, low-altitude airspace. Because the electrical grid extends into crowded airspaces, the UAV position was tracked with NASA unmanned aerial system traffic management (UTM) technology. The following results were obtained.

Inspection of high-voltage electrical transmission infrastructure to locate "hot spots" of ultraviolet emission may require navigation methods that are not broadly available and may not be needed at higher altitude flights above ground structures.

The sensing capability of a novel airborne ultraviolet (UV) detector was verified with a standard ground-based instrument. Flights with this sensor showed that UAV measurement operations and recording methods are viable. With improved sensor range, UAVs equipped with compact UV sensors could serve as the detection elements in a self-diagnosing power grid.

Data consolidation of rich lidar maps to polyhedral obstacle maps reduces data volume by orders of magnitude, so that computation with the resultant maps in real time is possible, which may enable real-time obstacle avoidance autonomy. Stable navigation may also be feasible in GPS-degraded or GPS-deprived environments near transmission lines by a UAV that senses ground structures and compares them to these consolidated maps.

A formally verified path conformance software system that runs onboard a UAV was demonstrated in flight. The software system successfully maneuvered the aircraft after a sudden lateral perturbation that models a gust of wind, and processed lidar-derived polyhedral obstacle maps in real time.

Tracking of the UAV in the national airspace using the NASA UTM technology was a key safety component of this reference mission, since the flights were conducted beneath the landing approach to a heavily used runway. Comparison to autopilot tracking showed that UTM tracking accurately records the UAV position throughout the flight path.

At altitudes above trees and buildings, waypoint-based autonomy via GPS guidance currently available in commercial autopilots was used for navigation. However, at lower altitudes and/or in close proximity to structures, GPS and radio communication quality was often variable and position control within a narrow tolerance is often needed to measure defects while avoiding collisions with ground structures. The navigational impact of radio degradation in one example of an obstacle-rich low-altitude airspace (e.g., air corridors adjacent to high-voltage transmission structures) and may warrant techniques to ensure safe, effective UAV traversal in those airspaces.

To provide realistic operational constraints and to bound the range of acceptable results, a specific mission was designed with UAV flight paths designed to allow UAVs to sample the airspace near ground structures. High-voltage electrical transmission infrastructure were inspected to locate "hot spots" of ultraviolet emission. A UAV was flown with a UV sensor near two test hot spot locations on a 500 kV transmission tower or structure. Comparison of the signals detected at points along the flight path to readings from a standard UV camera shows that UAV-based corona detection in real time is a viable alternative to ground-based detection.

Transient perturbations of aircraft position due to wind gusts add to the control challenge posed by radio degradation in this mission environment. Tests of a novel onboard flight path conformance software system are described for flights with and without a perturbation that models wind gusts. The system successfully maneuvered the UAV back onto the preplanned flight path after the perturbation and did not alter the UAV path in the unperturbed flight.

The intermittency of GPS in this mission environment can be ameliorated by taking advantage of rich lidar maps of transmission infrastructure routinely collected by electric utilities. The richness of this data creates a computation challenge; without data consolidation and representation (which may be described as data "simplification"), the data volume of the raw lidar maps would likely exceed UAV processing capabilities for real time processing. Two methods of data consolidation and representation are described that reduce data volume by orders of magnitude. Both methods are evaluated as aids for mission planning and for interpretation of UV sensor readings to find hot spots. The consolidated maps may be suitable as navigational tools. The data volume reduction provided by the consolidated maps may enable their use for rotary UAV navigation in a dense obstacle field.

Airborne avionics to sense transmission line faults and onboard computing to safely guide a UAV near high-voltage structures are essential components of an autonomous UAV-based electrical grid inspection capability. A fleet of UAVs equipped with these components could autonomously examine high-voltage structures, pinpointing locations of the grid with damage and equipment malfunction that represent potential or actual risks to power delivery. If distributed across a power grid (for example, at electrical substations), this fleet could serve as the detection foundation of a self-diagnosing power grid.

UAVs cached at locations across the grid, such as electrical substations, can be deployed on demand to locate and characterize the faults based on geographic outage maps and topological circuit maps. Imagery and other telemetry from the UAV deployments could then be interpreted remotely by experienced grid operation crews and line crews, enabling the rapid dispatch of a nearby line crew in a repair truck loaded with the components necessary to repair the fault.

Tracking such a fleet in the national airspace may be used to ensure that the operation of each UAV takes into account other members of the fleet, other UAVs, and manned aircraft. At altitudes above buildings and vegetation, geolocation via onboard GPS is reliable enough and accurate enough to prevent collision with other vehicles using self-separation and alerting technology. At the low altitudes of transmission lines, however, the complexity of measures required for safe flight increases, since precise geolocation of nearby obstacle fields and navigational means to avoid them is needed.

An example of an integrated air-ground UAV flight platform performing an electrical transmission line inspection reference mission at low altitudes in a densely occupied flight field is described herein. The UAV was built from commercial equipment and software supplemented with the following NASA-developed technologies: lidar-to-polyhedron preflight processing for obstacle demarcation to determine inspection standoff distance; Integrated Configurable Algorithms for Reliable Operations of Unmanned Systems (ICAROUS) flight path conformance software to monitor inspection standoff distance and correct the UAV trajectory during autonomous waypoint-based flight; telemetry repeater software to send the UAV position to a NASA UTM air traffic management server for tracking in the national airspace; and compact airborne ultraviolet (UV) sensing to detect transmission line faults.

In this example, fully-instrumented line-of-sight flights are described at altitudes up to 18 meters (about 59 feet) above ground level. For all flights, trajectory data from the autopilot is compared with a lidar-derived polygonal geofence. For two of the flights, the difference between the actual and planned trajectory is also compared, so as to illuminate the operation of the ICAROUS flight path conformance autonomy.

High-fidelity aerial lidar data of the test site was converted to polyhedral obstacle maps using both an illustrative 2.5D method and an illustrative 3D method. Terrestrial maps may ignore altitude, for example, by projecting all elevations to ground. This is a two-dimensional (2D) map. A map with altitude represented by a single value, such as the height of a rooftop, is a topographic or 2.5D map. A 2.5D map, while compact, does not depict features such as tunnels, overhangs on buildings, and open areas under tree canopies. To represent such features a full 3D map is used. The data reduction afforded by the two methods is compared and the processing capacity of the ICAROUS software on the specific hardware used in the flights is examined with reference to these polyhedral obstacle maps.

Sensors and concepts for autonomous transmission line inspection may be described in "Remote Sensing Methods for Power Line Corridor Surveys" (Matikainen et al. ISPRS Journal of Photogrammetry and Remote Sensing 119 (2016)) and "Vision Based Inspection of Transmission Lines Using Unmanned Aerial Vehicles" (Perez, 2016 IEEE International Conference) each of which is incorporated herein by reference in its entirety. A review of compact corona detection for transmission line inspection may be provided in "Autonomous Inspection of Electrical Transmission Structures with Airborne UV Sensors-NASA Report on Dominion Virginia Power Flights of November 2016" (Moore, Andrew J., Matthew Schubert, and Nicholas Rymer, NASA Technical Memo 2017-219611 (2017)) and "UAV Inspection of Electrical Transmission Infrastructure with Path Conformance Autonomy and Lidar-based Geofences—NASA Report on UTM Reference Mission Flights at Southern Company Flights November 2016" (Moore, Andrew J., Matthew Schubert, and Nicholas Rymer, NASA/TM-2017-219673 (2017)), each of which is incorporated herein by reference in its entirety. Data reduction approaches for 3D lidar point clouds may be described in "Reconstruction of Polygonal Prisms From Point-clouds of Engineering Facilities" (Chida, Akisato, and Hiroshi Masuda. Journal of Computational Design and Engineering 3.4 (2016): 322-329) which is incorporated herein by reference in its entirety. Airborne lidar (also known as airborne laser scanning) was adopted broadly by the utility industry in the last decade to meet transmission line safety requirements (Wolf, Gene. "LiDAR Meets NERC Alert." Transmission & Distribution World 63.8 (2011): 9-13) which is incorporated herein by reference in its entirety.

Figure 10:
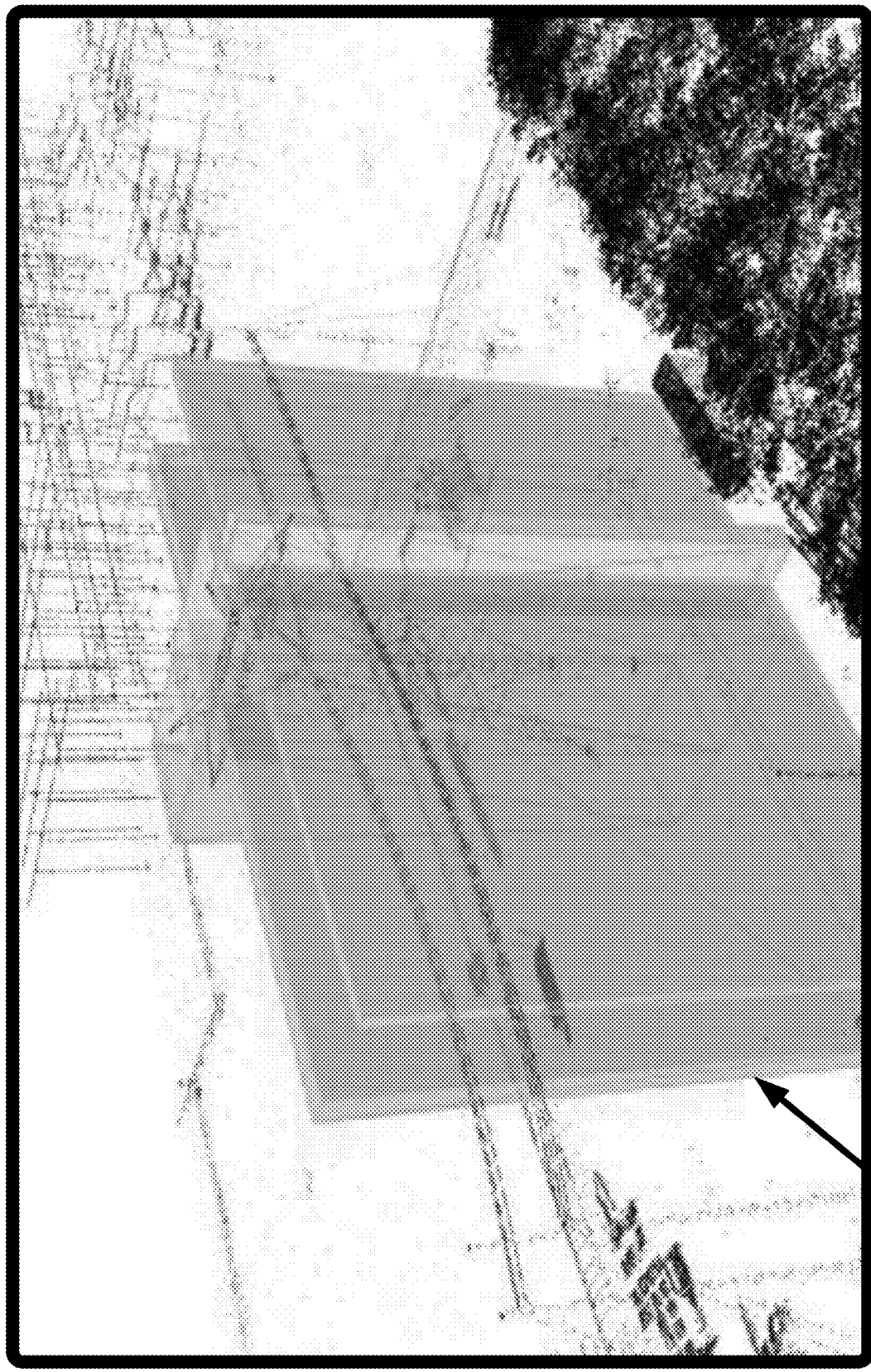
FIGS. 10 and 11 are images of a ground surface and structures thereon, and illustrative lidar-data generated 2.5-D polyhedral geofences.
Figure 11:
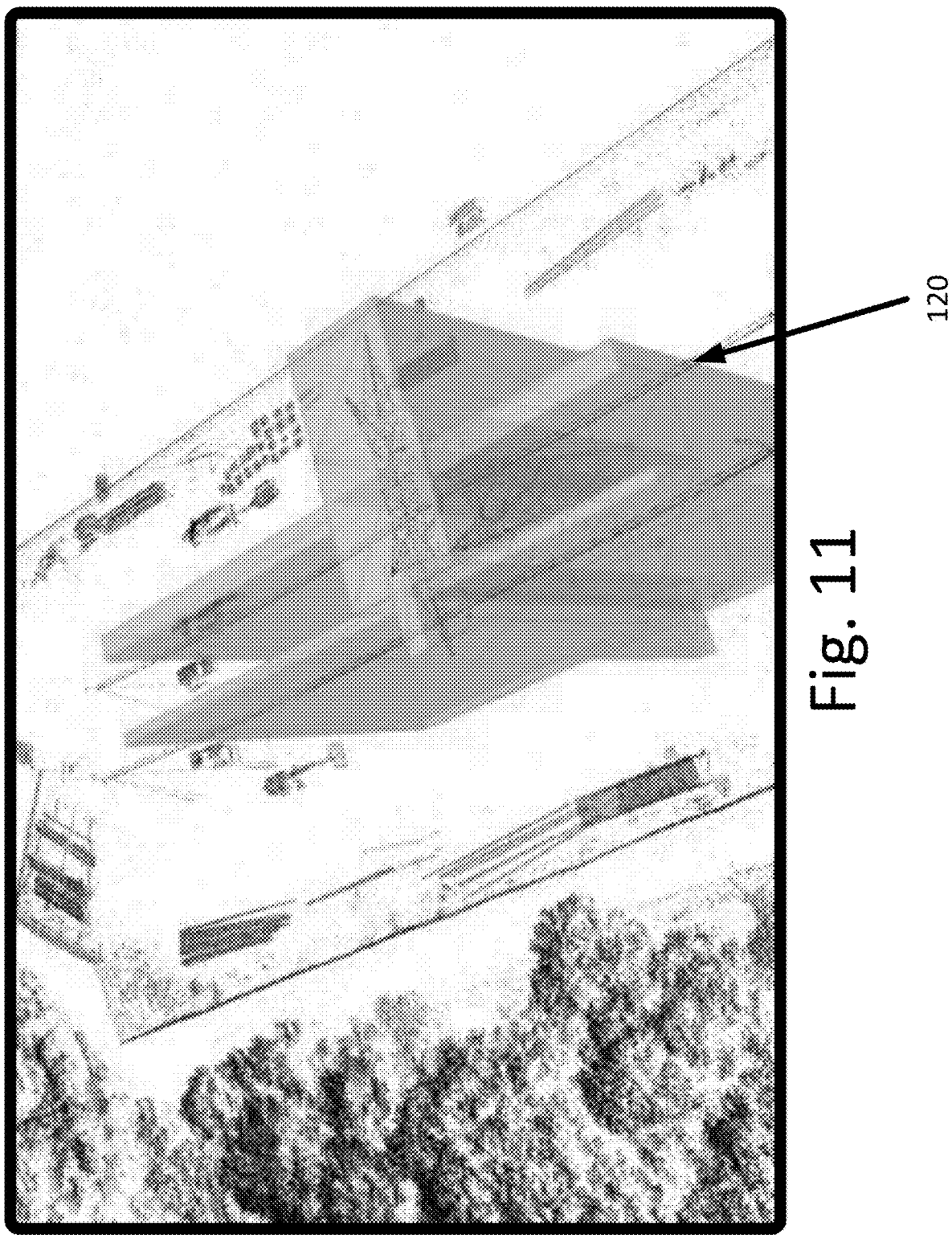

FIGS. 10 and 11 are images that depict polyhedrons of a 2.5D lidar-data generated polyhedral geofence 120 generated using the illustrative methods, processes, and algorithms described herein that may be used for flight path planning. A set of computed polyhedrons (rectangles) surrounds a 500 kV transmission tower and conductors in these views from the southwest (left) and southeast (right).

The polyhedrons were computed via the following 2.5D recipe:
1. The lidar in LAS format was imported with the spatial projection "NAD 1983 StatePlane Georgia West FIPS 1002 (US Feet)"
2. The ArcGIS function LASToMultipoint_3d was used to convert to raster
3. The ArcGIS function FeatureClassZToASCII_3d was used to convert the raster lidar points to (x,y,z) triplets and to export them to a text file.
4. A NASA C++ program
    a) read the 3D data from the text file,
    b) converted the coordinates to latitude/longitude/altitude triplets
    c) traversed the set of triplets, first along lines of latitude and then along lines of longitude, finding the maximum altitude. The effective grid spacing (minimum feature spacing) is five decimal places in a decimal latitude and decimal longitude (approximately 0.1 meters of precision at this latitude). A polyhedron from the maximum altitude to ground at that grid location was constructed.
    d) wrote the polyhedron to a KML file for visualization in a 3D map.

These polyhedrons were used to verify a safe standoff distance from the tower and conductor. In particular, the waypoints for autonomous flights were checked to ensure a safe distance from the lidar-derived 2.5D polyhedral "wrapper" around the 500 kV transmission tower and conductors.

Figure 12:
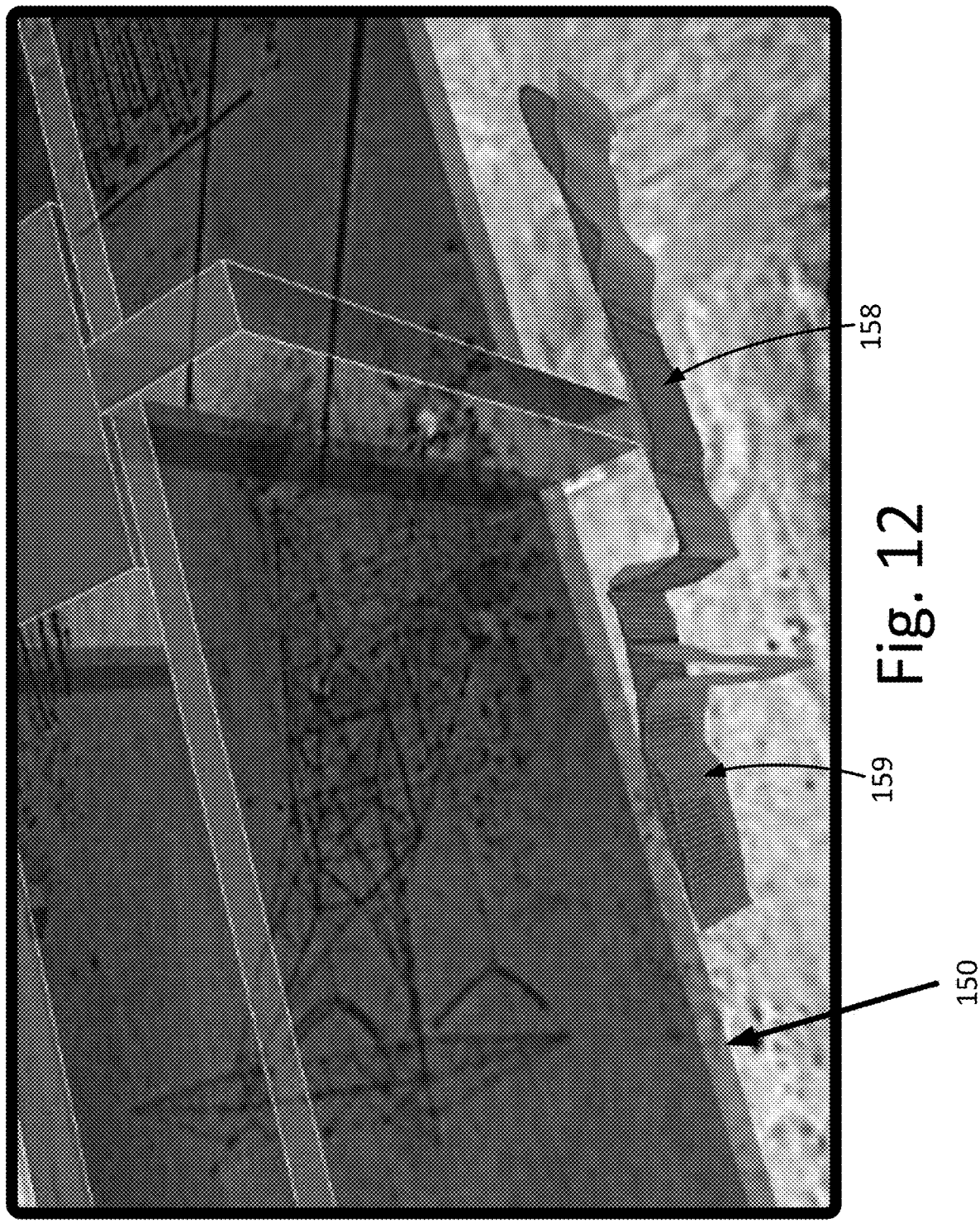
FIG. 12 is an image of a ground surface and structures thereon, illustrative lidar-data generated 2.5-D polyhedral geofences, and an illustrative autonomous trajectory correction flight.
Figure 13:
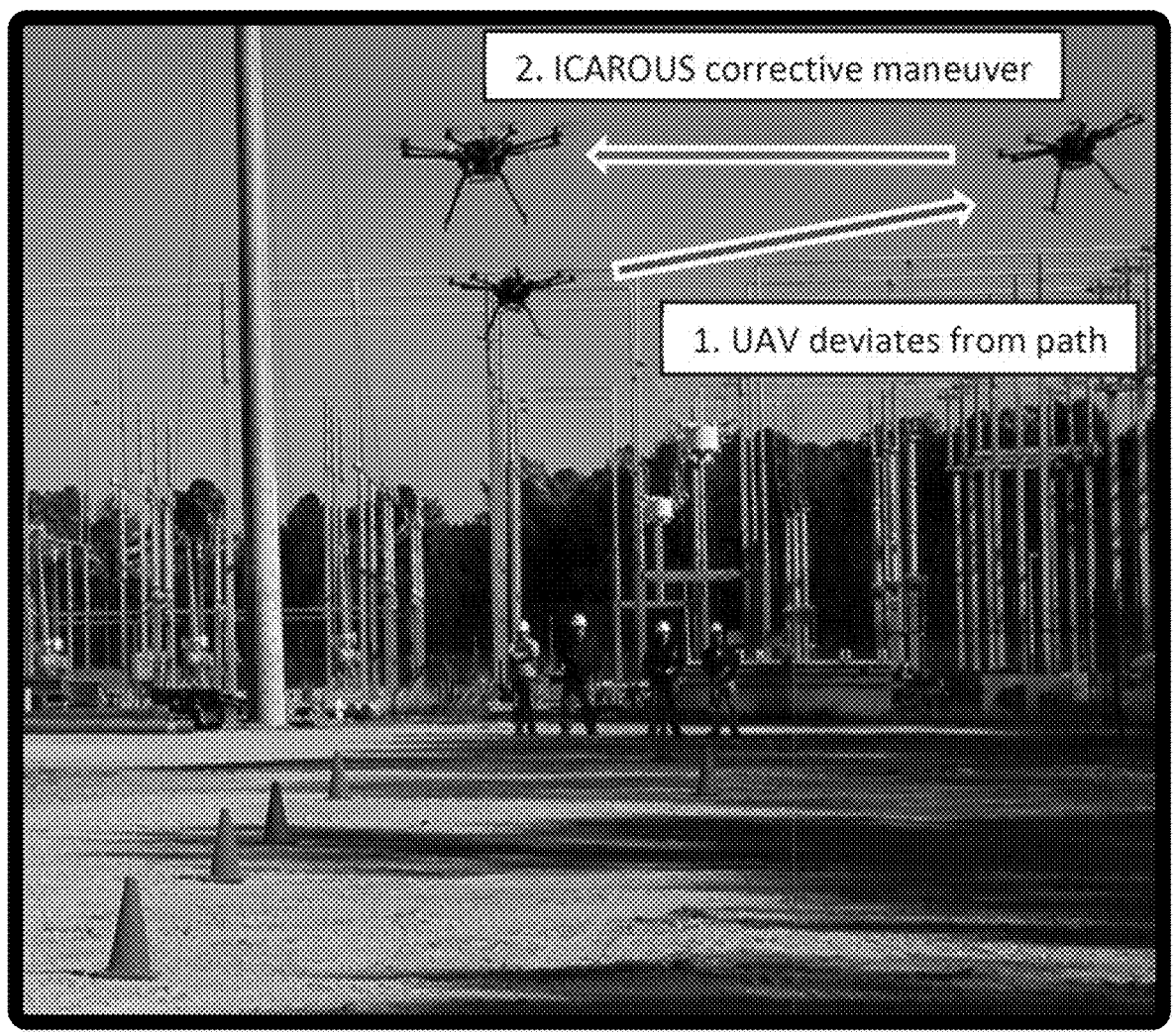
FIG. 13 is a composite image of UAV position at three different times during a flight.

A further set of flights are depicted in FIG. 12 which is an image that includes polyhedral geofence 150. This set of flights tested ICAROUS, which is a trajectory management software technology that monitors the UAV position and corrects the trajectory to keep it within a flight corridor during autonomous waypoint-based flight. Running on an onboard microcomputer, ICAROUS reads the telemetry stream that the autopilot sends to the ground station and injects commands into the telemetry stream that the ground station sends to the autopilot. In this test its return-to-mission capability was exercised in a control flight without wind gust perturbation and in an experimental flight with a transient lateral perturbation that models a wind gust.

In a control flight 158 the UAV followed a dog-leg path defined by four waypoints near the 500 kV transmission tower at five-meter altitude. In an experimental flight 159 the UAV was launched along the same path, but the pilot manually perturbed the flight, yanking it to the left to emulate a wind gust. ICAROUS sensed the perturbation, yawed the aircraft back toward the centerline of the pre-planned flight path, and "drove" the UAV back to the intended path. Once the UAV was in conformance with the original flight path, the ICAROUS onboard autonomy yawed the aircraft to face the originally intended nose direction and ceased injecting commands into the autopilot-bound telemetry. The autopilot waypoint-based navigation capability took over from that time point and completed the flight. The composite image of FIG. 13, constructed from three key frames of the video record, illustrates the perturbation and autonomous recovery. The onboard ICAROUS trajectory management software detected that the UAV was not positioned in the planned flight corridor and maneuvered it to return to the centerline of the flight path.

In the flights described above, the polyhedral representation of the tower and conductors, derived from lidar, was used to verify path planning and to visualize results. While ICAROUS is capable of using an obstacle field represented in this way to enforce a safe UAV trajectory, the poor reliability of GPS near ground structures may warrant the use of sGPS and an obstacle standoff distance (e.g., six meters or about twenty feet) much greater than the unipath sGPS uncertainty envelope.

The ability of available onboard autonomy to ingest and process derived polyhedrons was tested with the rich lidar map of a representative industrial location. Two polyhedral obstacle fields were prepared from two areas on the site: the first area, 30 m×60 m in size, contains a 500 kV transmission tower and the second area, 300 m×300 m in size, contains buildings, trees and high-voltage bus bars. These areas are labeled "500 kV Section" and "North Quarter," respectively, in Table 1. Table 1 depicts the data reduction of two areas using 2.5D and 3D algorithms.

TABLE 1

|  | Point Count (Original Lidar) | Polyhedrons Count 2.5D z Clustering | Polyhedrons Count (3D Cylindrical Clustering) |
| --- | --- | --- | --- |
| 500 kV Section | 7,965 | 6 | 146 |
| North Quarter | 2,388,823 | 406 | 22,380 |

Figure 14:
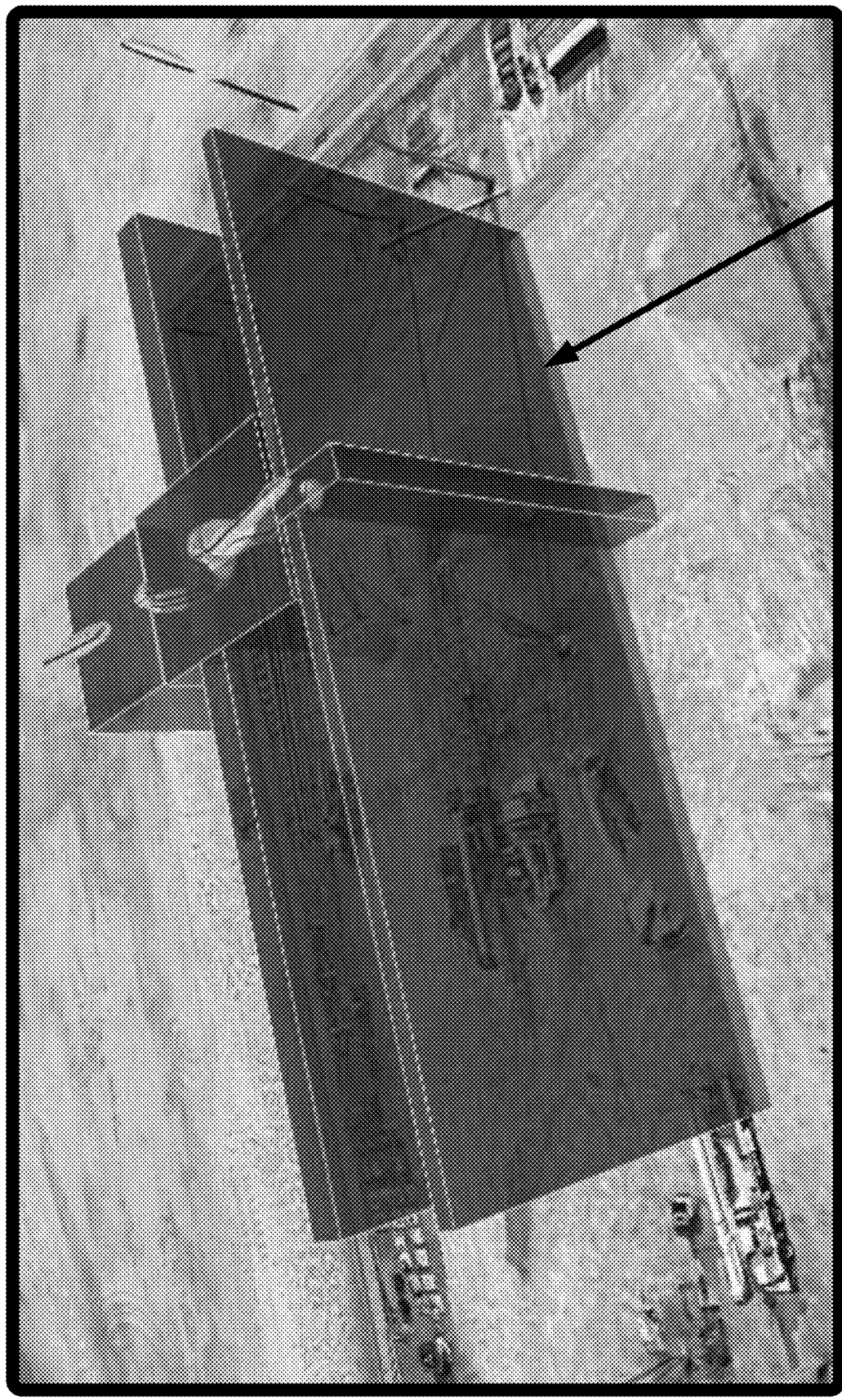
FIGS. 14-19 are images of a ground surface and structures thereon, and illustrative lidar-generated polyhedral geofences at different locations and structures.
Figure 15:
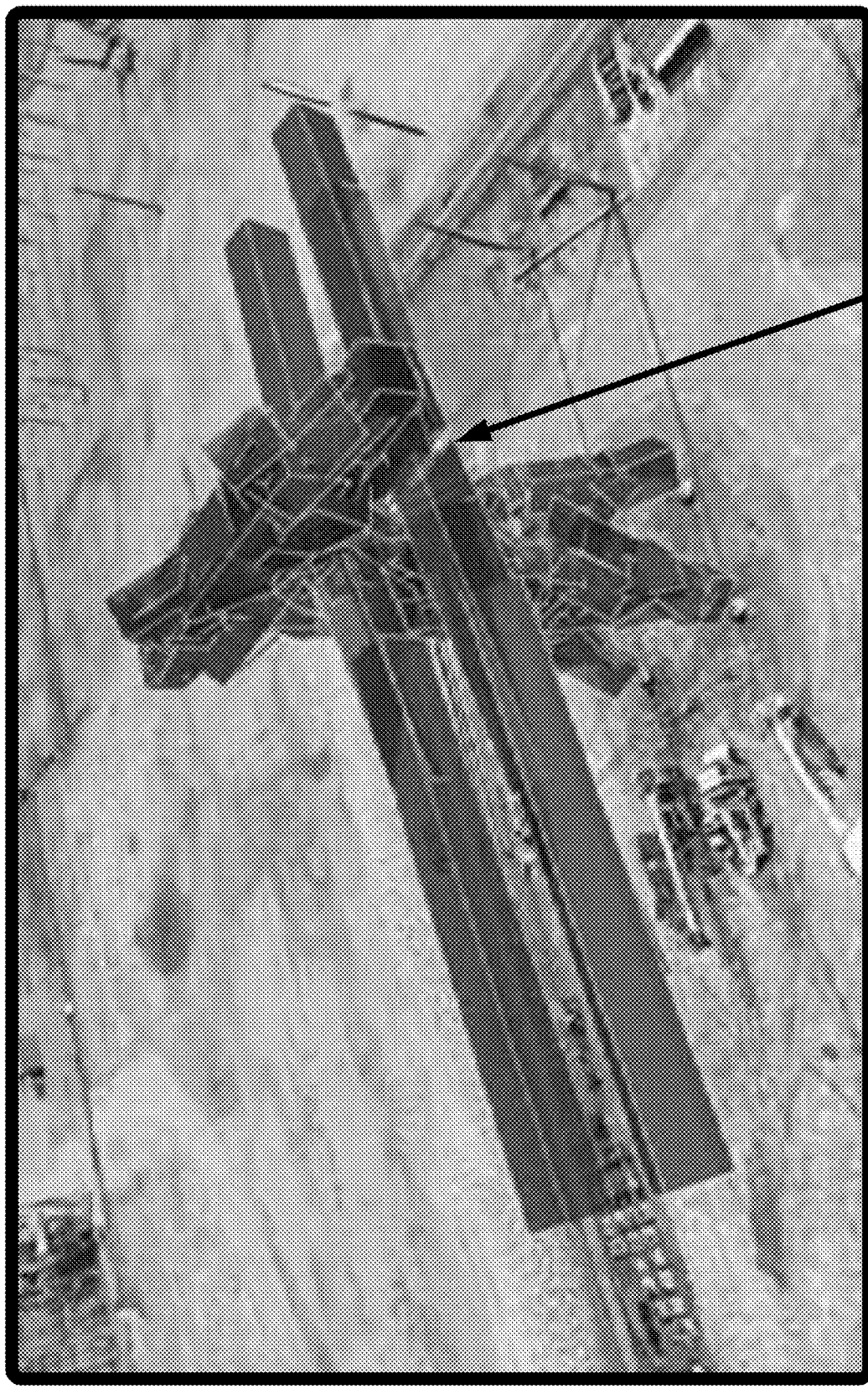
Figure 16:
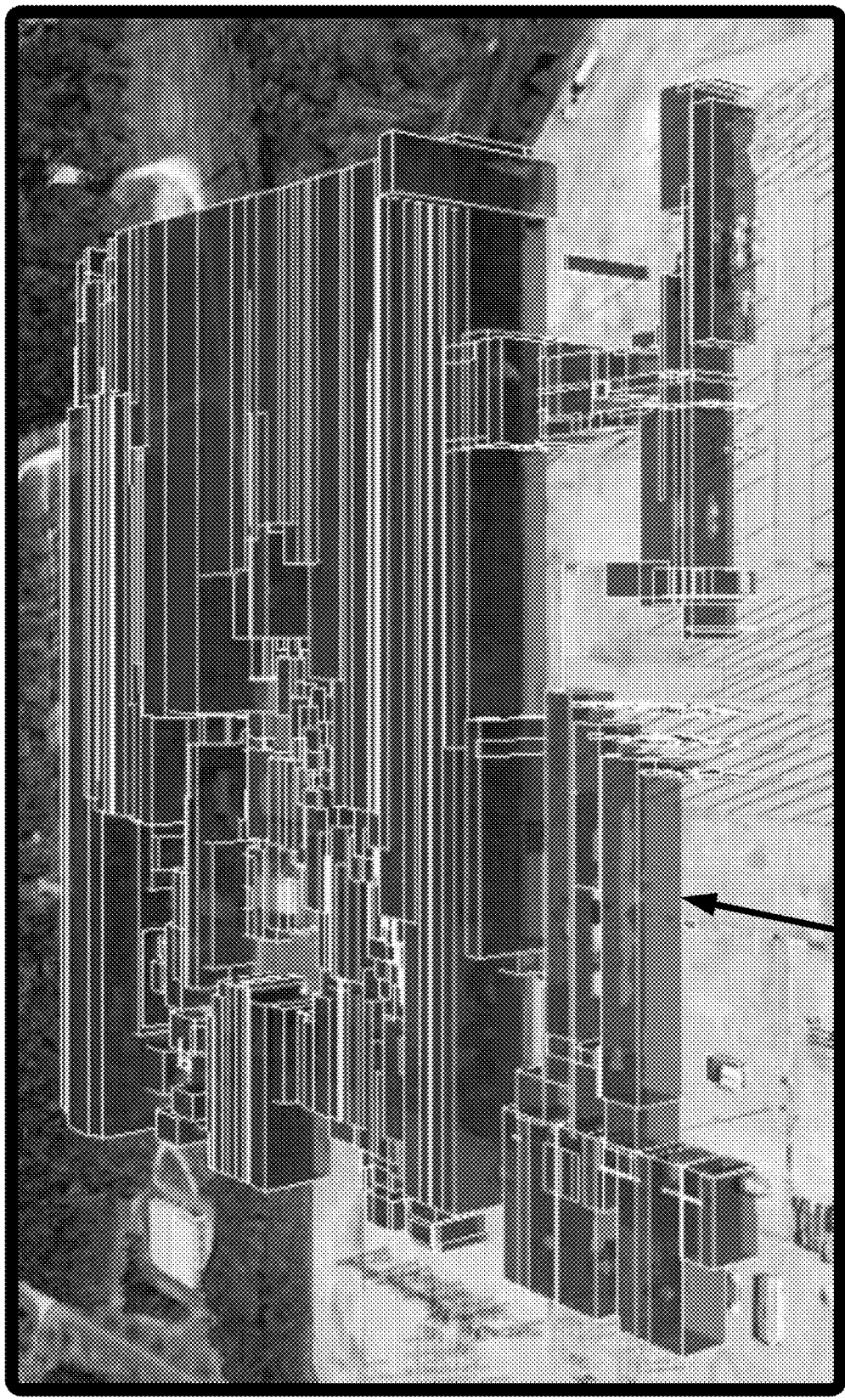
Figure 17:

FIGS. 14-17 are images that depict variations of obstacle field size and detail to test ICAROUS capacity. FIG. 14 depicts the 500 kV Section in a 2.5D polyhedral geofence 152. FIG. 15 depicts the 500 kV Section in a 3D polyhedral geofence 154. FIG. 16 depicts the North Quarter in a 2.5D polyhedral geofence 160. FIG. 17 depicts the North Quarter in a 3D polyhedral geofence 162.

After removing ground lidar points, obstacle maps of the two areas were produced using the 2.5D method described above. In addition, 3D obstacle maps were computed via the following C++ recipe:
1. Convert the (x,y,z) triplets file to a Point Cloud Library PCD file
2. Cluster triplets using cylindrical modeling
   a) Read point cloud from PCD file
   b) Find neighborhood groupings using a 1 m nearest neighbor radius search, an eigenvector-aligned cylindrical search with 0.4 m radius, and an eigenvector difference in angle comparison looking for a difference less than ~26 degrees for the eigenvectors of the largest eigenvalues
   c) Merge neighborhoods using proximity-based metrics
   d) Assign each neighborhood a label and output them as a labeled point cloud PCD file
3. Compute a minimum bounding box for each of the labeled neighborhoods and output them as a text file
4. Convert the text file of boxes to KML for visualization in a 3D map Table 1 shows the input point count and the resulting polyhedrons count for both areas and methods. The 3D method reduces the data volume approximately by a factor of 50-100, while the 2.5D method reduces the data volume by a factor of 1000-5000. Each input lidar points is a x,y,z triplet. Each output polyhedron is a right rectangular prism with 8 vertices, representable as 8 x,y,z triplets, or more compactly as 3 x,y,z triplets and a height. The numerical data reduction is therefore a factor 3.3-8 lower than the data volume reduction, depending on downstream processing numerical representation.

Input capacity and processing capacity of the version of ICAROUS used in the flights was tested using the 2.5D polyhedrons on the same hardware used in the flights. It loaded both the 500 kV Section and North Quarter maps successfully; its input capacity exceeds 406 polyhedrons. To gauge processing capacity, polyhedrons from the North Quarter map were added ten at a time until 50% of the processing time was needed for polygon processing, leaving a 50% compute margin for trajectory calculation, at a trajectory correction rate of once per second. This threshold was observed for ~200 polyhedrons, corresponding to an area of size 150 m×130 m. This result indicates that the obstacle field created from the 500 kV Section with the more detailed 3D method (FIG. 15) will not impose a processing load too burdensome for real-time 3D obstacle avoidance. However, the obstacle field created from the North Quarter with the 3D method (FIG. 17), with its many polygonal facets bounding the tree canopy on the site is not simplified enough for real-time obstacle avoidance. A foliage digital elevation map representation of the tree canopy should bring the geometry count of the North Quarter down to a level that ICAROUS can respond to rapidly.

Several caveats should be made about interpreting the processing capacity test using this data set. First, the geometric processing load is highly dependent on the density and spatial configuration of the polyhedrons. Second, as well as simplifying altitude, the 2.5D method computed only aligned orthogonal polyhedrons faces oriented east-west and north-south, with obstacles in the east-west direction (the left-right direction in FIG. 14) clumped together into a large polyhedron. Third, optimization of ICAROUS is under active development, and it can run on more powerful compact hardware.

Figure 18:
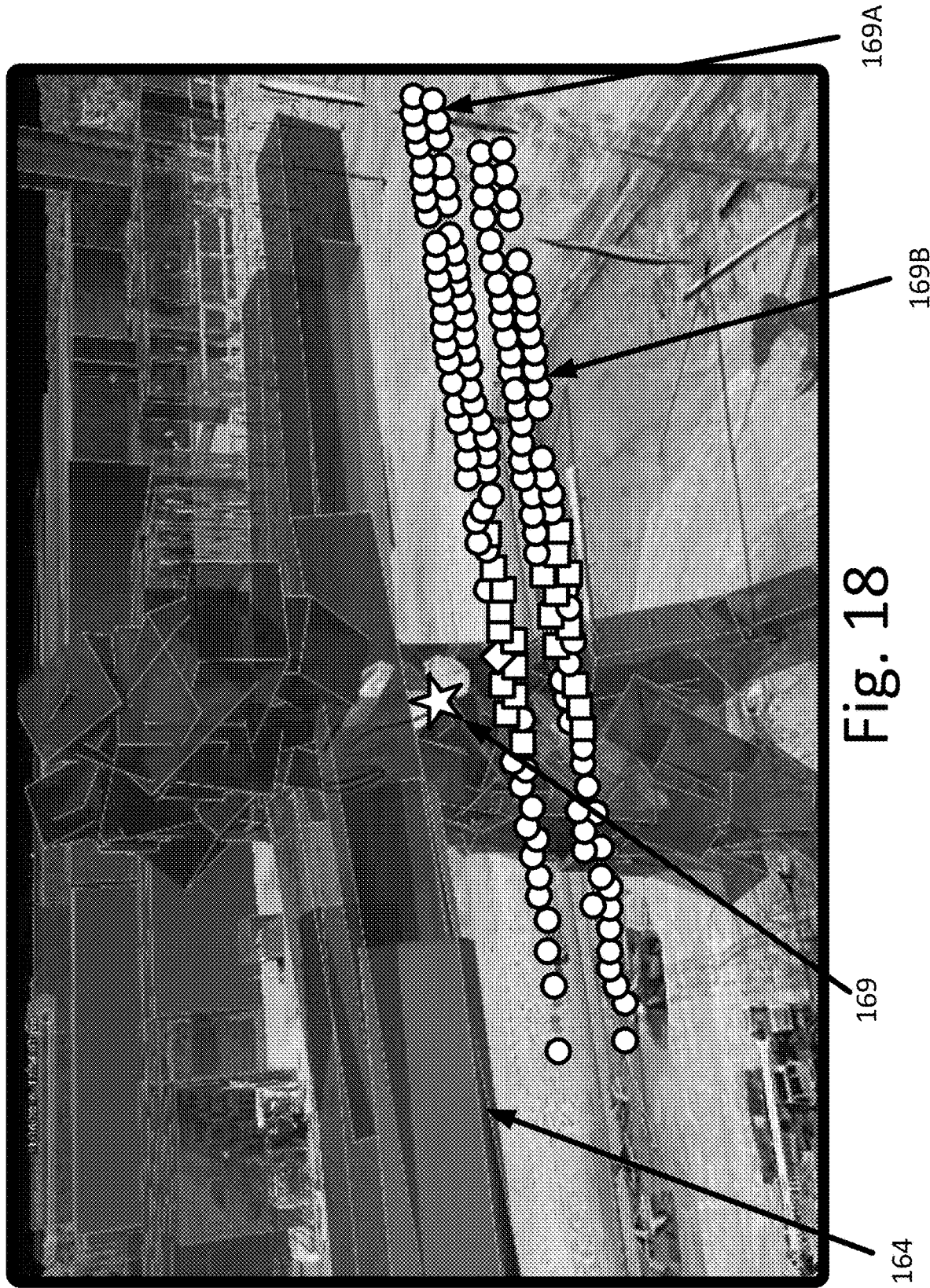
Figure 19:

A mix of 2.5D and 3D polyhedrons representations may be the most suitable way to trade off spatial detail and data volume in mapping the obstacle environment. For example, FIGS. 18 and 19 are images that show the UV signal during flights 169A and 169B proximate to a 3D representation 164 (e.g., 3D polyhedral geofence) of the inspection target, with the North Quarter obstacle represented in 2.5D in the background. The distant North Quarter obstacle do not require full 3D treatment, but a 3D rendition of the 500 kV transmission tower makes it easier to pinpoint the location of a corona fault test signal (star 169) and more faithfully outlines the nearby obstacle field for processing with onboard autonomy.

In concert with the 3D tower rendering 164, sensor results that indicate signal strength and direction help to make the inspection result intuitive. In FIGS. 18 and 19, a scale indicates the magnitude at points along the flight path of the relative UV intensity plotted. The UV time series measurements from flights 169B (lower trace, 16 m altitude) and 169A (upper trace, 18 m altitude) are shown as a percentage of sensor range with a graduated scale: circles indicate that no signal was detected (0% of sensor range), and the scale proceeds through squares and finally to diamonds at approximately 75% of sensor range. With a point emitter tip, the corona generator radiates isotropically with a $1/R^2$ drop-off in areal flux density. The flight paths approximate chords of a circular planar section of the radiated photon field, with the 169A chord (upper trace, 18 m altitude) closer to the center of the planar section and to the origin of the spherically symmetric flux field than 169B chord (lower trace, 16 m altitude). As expected from the optical geometry of FIGS. 18 and 19, the observed signal strength and duration are greater in the 169A flight than in the 169B flight.

A preprocessing approach was employed in this example to simplify a rich, precise (subdecimeter) lidar map to a small number of polyhedrons suitable for subsecond processing on an onboard microcomputer. Small UAVs are increasingly available for inspection of and transit near ground structures. However, the ability to determine the spatial position of the UAV accurately (e.g., within a decimeter) near ground structures remains a challenge. A commonly used UAV position determination method, single-ended GPS, senses orbital GPS satellite signals with a single antenna mounted on the UAV. At altitudes far above ground structures, sGPS has a unipath positional uncertainty of +−2 meters horizontally and +−3 meters vertically with 95% confidence. By comparing the signal received on the UAV antenna with a signal received at an additional antenna mounted at a fixed, surveyed position, a differential GPS measurement can be computed with a much smaller positional uncertainty (+−4 cm or better horizontally and vertically). Transmission of the signal between the two dGPS antenna sites is accomplished via a cable (if both sites are on the ground) or radio link (if one of the sites is airborne).

If the UAV is positioned at low altitude (e.g., below treetops and/or rooftops), its GPS antenna may receive satellite signals along more than one path: a direct (in other words, line of sight) path from the satellites and one or more non-direct paths reflected from the terrain and ground structures (e.g., multipath signals). Current sGPS processing methods can reject a second signal that arises from flat terrain reflection. However, methods to disambiguate complex multipath signals from nonplanar terrain and/or ground structures are not yet mature. If not rejected, extraneous reflected (multipath) orbital signals can cause errors that are interpreted as a position shift. sGPS position shifts equal to or higher than the 95% confidence unipath horizontal uncertainty (~2 meters) are not uncommon at low altitude near vegetation and structures.

Differential measurements do not necessarily improve matters in a multipath environment, since the radio link between GPS receiver units in an air-ground dGPS system is also subject to multipath degradation, which leads to loss of differential lock and the enhanced location precision it provides. The radio signal between GPS receiver units may traverse non-direct paths reflected from the terrain and ground structures, etc.; disambiguating direct from non-direct inter-GPS signals is not mature. Few attempts (prior to the flights described) to achieve stable, precise UAV position near ground structures via dGPS were successful.

Mapping of terrain and structures could be conducted with low altitude lidar equipped UAVs. The cost of equipment and operations would be substantially lower for low altitude UAVs as compared to orbital or high altitude atmospheric (fixed wing or helicopter) platforms. Currently there is not a reliable position determination technology sufficient to geolocate low altitude UAVs with the precision required for sub-decimeter lidar mapping. Precise, stable IMUs (inertial measurement units, e.g., gyroscopes) are too heavy, bulky, and power-hungry for mounting on most low-cost, low altitude UAVs. Unipath single-ended GPS has a positional uncertainty of 2-3 meters, and both sGPS and dGPS equipment is subject to drop outs, instabilities and high positional inaccuracy when flown near ground structures, as discussed above.

High altitude (e.g., greater than 122 meters or about 400 feet) airborne lidar has been available for decades and is used to map variations in terrain elevation and the locations and elevations of ground structures, such as trees and buildings, to within a decimeter. Airborne platforms that are equipped with mapping lidar, such as airplanes, helicopters, and satellites are also equipped with instruments to accurately determine the spatial position of the platform, such as high precision IMUs, or high precision differential GPS. IMUs are not dependent on radiolocation, and so are immune to electromagnetic scattering. At high altitudes, differential GPS receivers are far away from electromagnetically scattering structures on the ground, so that the GPS signal used to determine the position of the measurement aircraft is stable and accurate across several overflights (sweeps) of a particular point on earth. Commonly, multiple lidar sweeps are performed over the area to be mapped and the sweeps are conducted from multiple directions, so that no shadowing artifacts degrade the three-dimensional lidar point map of the terrain and ground structures.

Due to their high data volume, high fidelity lidar point clouds of terrain and structures are not suitable for a compact representation of an obstacle field. For example, a contemporary high fidelity lidar point cloud with 4 cm horizontal resolution and precision of ½ meter contains tens of millions of individual lidar points in each square mile of ground area (after points along the ground are removed).

Collision avoidance methods suitable for execution in real time on small UAVs, such as the ICAROUS method used in these flights, are capable of reading the position and velocity of the UAV and calculating a spatial envelope around the UAV that must be obstacle free to avoid collision with the obstacles. However, given current onboard computer hardware, these collision avoidance software programs are limited in the amount of data they can process to determine obstacle location rapidly (in one second or less). Geometric simplification of the boundaries of obstacle surfaces is required for sufficiently rapid (one second or less) processing by contemporary collision avoidance methods running on compact airborne hardware.

Simplified boundary representations of some ground structures are available. Commonly referred to as digital elevation maps, these representations are used, for example, to map tree canopies in environmental and geological studies. Except for indoor areas and limited outdoor areas, simplified geometric representations of obstacle boundaries derived from lidar point clouds have not been widely used for UAV collision avoidance.

Lidar sensors mounted on the UAV may be suitable for acquiring a lidar point cloud used to determine obstacle boundaries if two constraints are accepted. First, vehicle-centric rather than georeferenced obstacles should be used. An accurate georeferenced registration of the point cloud requires accurate spatial determination of the UAV position, and, as described previously, electromagnetic scattering by the obstacles themselves prevents precise determination of the UAV position. Secondly, low-power lidar sensor/processor payloads should "map out" obstacles in a way that is suitable for obstacle avoidance in real time (e.g., one second or less). Time lags from point cloud acquisition and processing the point cloud data into vehicle-referenced polyhedrons must fall at or under a threshold time (e.g., one second or less) to be suitable for obstacle avoidance in real time.

By applying two methods at either side of the range of lidar-to-polyhedrons simplification on a real lidar obstacle map, one can approximately bound the degree of data reduction and the corresponding suitability for spatial control of a UAV. The 2.5D method represents the extreme of high data reduction and low spatial fidelity, while the 3D method represents the extreme of lower data reduction and high spatial fidelity. For the two examples selected from the high voltage industrial site data set, the 2.5D method provides more than an order of magnitude greater data reduction at the cost of a conservatively outlined obstacle field. With the higher compression of the 2.5D method, the onboard trajectory management software/hardware required about two seconds to process the North Quarter obstacle field. In the inspection flights described, UAV velocity was 1 m/sec, so that the obstacle collision avoidance during navigation is viable. More powerful computing hardware and dynamic software partitioning of the polyhedrons data during the UAV flight is needed if the UAV is a) moving rapidly or b) using a richer representation such as that produced by the 3D method.

High accuracy, high precision aerial lidar maps are available for most high voltage infrastructure in North America. The raw data volume of those maps is too high for airborne trajectory management at this time, even for the modest areas that may be traversed on a single battery charge by a rotary UAV. Detailed 3D polygon shells were computed that enclose the lidar points, faithfully enough for flight planning and obstacle avoidance, at 50-100 times lower data volume. Even simpler 2.5D processing produced a spatial representation sufficient for planning and safety and reduced the data volume by a further factor of 20-50 (e.g., a factor of 1000-5000 over the raw high fidelity lidar). A set of 2.5D polyhedrons that enclosed a 500 kV transmission tower and conductors was used to plan a UAV flight path past the tower and parallel to the conductors. The path was flown twice, with the autopilot listening for instructions from onboard ICAROUS autonomous path conformance technology. In the first flight, the UAV was allowed to follow the path exactly, so that ICAROUS did not need to issue course corrections. In the second flight, the UAV was veered off-course as if struck by a side wind gust. ICAROUS issued course corrections to bring the aircraft back to the center of the flight path; once the UAV was returned to a safe trajectory, the autopilot resumed the flight to completion.

All patents, patent documents, and references cited herein are incorporated in their entirety as if each were incorporated separately. This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the apparatus and methods described herein. Various modifications of the illustrative embodiments, as well as additional embodiments of the disclosure, will be apparent upon reference to this description.

What is claimed:

1. An aerial vehicle comprising:
   a propulsion apparatus comprising at least one engine to provide propulsion; and
   a controller comprising one or more processors and operably coupled to the propulsion apparatus to control flight of the vehicle, the controller configured to fly the vehicle using the propulsion apparatus based on at least a lidar-data generated polyhedral geofence, wherein the lidar-data generated polyhedral geofence is a 2.5-dimensional (2.5D) polyhedral geofence comprising a plurality of 2.5D polyhedrons, wherein each of the plurality of 2.5D polyhedrons are defined by a polygonal area extending from a ground surface to a maximum altitude.

2. The aerial vehicle of claim 1, further comprising a positioning system used to determine three-dimensional coordinates of the aerial vehicle; and
   wherein the controller flies the aerial vehicle using the propulsion apparatus further based on at least the determined three-dimensional coordinates.

3. The aerial vehicle of claim 2, wherein the positioning system comprises a lidar sensor system to sense distance between the aerial vehicle and one or more structures.

4. The aerial vehicle of claim 3, wherein the controller determines three-dimensional coordinates based on at least the lidar-data generated polyhedral geofence and the distance between the aerial vehicle and the one or more structures.

5. The aerial vehicle of claim 2, wherein the positioning system comprises a global positioning system (GPS) to determine the three-dimensional coordinates, wherein the GPS comprises an antenna to receive GPS signals.

6. The aerial vehicle of claim 1, wherein the controller flies the aerial vehicle to avoid one or more objects defined by the lidar-data generated polyhedral geofence.

7. The aerial vehicle of claim 1, wherein the controller flies the aerial vehicle according to a flight path to inspect one or more objects defined by the lidar-data generated polyhedral geofence.

8. The aerial vehicle of claim 7, wherein the controller flies the vehicle to within a selected inspection distance from the one or more objects for inspection.

9. The aerial vehicle of claim 1, further comprising a sensor to gather inspection data from one or more objects defined by the lidar-data generated polyhedral geofence.

10. A method of flying an aerial vehicle comprising:
    flying the vehicle based on at least a lidar-data generated polyhedral geofence, wherein the lidar-data generated polyhedral geofence is a 2.5-dimensional (2.5D) polyhedral geofence comprising a plurality of 2.5D polyhedrons, wherein each of the plurality of 2.5D polyhedrons are defined by a polygonal area extending from a ground surface to a maximum altitude.

11. The method of claim 10, further comprising determining three-dimensional coordinates of the aerial vehicle, wherein flying the aerial vehicle is further based on at least the determined three-dimensional coordinates.

12. The method of claim 11, further comprising sensing distance between the aerial vehicle and one or more structures.

13. The method of claim 12, wherein determining three-dimensional coordinates is based on at least the lidar-data generated polyhedral geofence and the distance between the aerial vehicle and the one or more structures.

14. The method of claim 11, further comprising receiving GPS signals, wherein determining three-dimensional coordinates is based on at least the received GPS signals.

15. The method of claim 10, further comprising flying the aerial vehicle to avoid one or more objects defined by the lidar-data generated polyhedral geofence.

16. The method of claim 10, further comprising flying the aerial vehicle according to a flight path to inspect one or more objects defined by the lidar-data generated polyhedral geofence.

17. The method of claim 16, further comprising flying the aerial vehicle to within a selected inspection distance of the one or more objects for inspection.

18. The method of claim 10, further comprising detecting a defect in one or more objects defined by the lidar-data generated polyhedral geofence.

19. A method of generating a polyhedral geofence for a vehicle comprising:
    receiving lidar data; and
    generating a polyhedral geofence usable by a vehicle based on the lidar data, wherein the lidar-data generated polyhedral geofence is a 2.5-dimensional (2.5D) polyhedral geofence comprising a plurality of 2.5D polyhedrons, wherein each of the plurality of 2.5D polyhedrons are defined by a polygonal area extending from a ground surface to a maximum altitude.

20. The method of claim 19, wherein the lidar-data generated polyhedral geofence comprises at least one 2.5-dimensional polyhedron and at least one 3-dimensional polyhedron.

21. The method of claim 19, wherein generating the polyhedral geofence from the lidar data comprises:
determining a set of triplets from the lidar data, each triplet of the set of triplets representing a latitude, a longitude, and an altitude of a point of an object;
determining one or more features based on the set of triplets;
determining one or more polyhedrons, each polyhedron fitted to one of the one or more features; and
generating the polyhedral geofence comprising the determined one or more polyhedrons.

22. The method of claim 21, wherein determining the one or more features comprises determining a grid for each of the one or more features based on a minimum feature spacing of the latitude and longitude of each triplet of the set of triplets, the grid comprising a polygonal area.

23. The method of claim 21, wherein determining the one or more polyhedrons comprises:
determining a maximum altitude for each of the one or more features; and
determining a shape and size of each of the one or more polyhedrons based on a polygonal area and the maximum altitude.

24. The method of claim 21, wherein determining the one or more features comprises clustering the set of triplets using cylindrical modeling comprising:
grouping the set of triplets into neighborhoods based on a feature radius; and
merging the neighborhoods into the one or more features based on an eigenvector-aligned cylindrical filter and an eigenvector angle alignment filter.

25. The method of claim 21, wherein determining the one or more polyhedrons comprises determining a minimum bounding box for each of the one or more features.

26. The method of claim 21, wherein generating the one or more polyhedral geofences comprises expanding the one or more polyhedrons based on a safe proximity distance, wherein the safe proximity distance is configured to provide a safe distance for the vehicle to move therefrom.

27. A method of generating a polyhedral geofence for a vehicle comprising:
receiving lidar data;
generating a polyhedral geofence usable by a vehicle based on the lidar data, wherein
generating the polyhedral geofence from the lidar data comprises:
determining a set of triplets from the lidar data, each triplet of the set of triplets representing a latitude, a longitude, and an altitude of a point of an object;
determining one or more features based on the set of triplets;
determining one or more polyhedrons, each polyhedron fitted to one of the one or more features; and
generating the polyhedral geofence comprising the determined one or more polyhedrons.

28. The method of claim 27, wherein the lidar-data generated polyhedral geofence is a 2.5-dimensional (2.5D) polyhedral geofence comprising a plurality of 2.5D polyhedrons, wherein each of the plurality of 2.5D polyhedrons are defined by a polygonal area extending from a ground surface to a maximum altitude.

29. The method of claim 27, wherein the lidar-data generated polyhedral geofence is a 3-dimensional (3D) polyhedral geofence comprising a plurality of 3D polyhedrons, wherein each of the plurality of 3D polyhedrons are defined by a polyhedral volume.

30. The method of claim 27, wherein the lidar-data generated polyhedral geofence comprises at least one 2.5-dimensional polyhedron and at least one 3-dimensional polyhedron.

31. The method of claim 27, wherein determining the one or more features comprises determining a grid for each of the one or more features based on a minimum feature spacing of the latitude and longitude of each triplet of the set of triplets, the grid comprising a polygonal area.

32. The method of claim 27, wherein determining the one or more polyhedrons comprises:
determining a maximum altitude for each of the one or more features; and
determining a shape and size of each of the one or more polyhedrons based on a polygonal area and the maximum altitude.

33. The method of claim 27, wherein determining the one or more features comprises clustering the set of triplets using cylindrical modeling comprising:
grouping the set of triplets into neighborhoods based on a feature radius; and
merging the neighborhoods into the one or more features based on an eigenvector-aligned cylindrical filter and an eigenvector angle alignment filter.

34. The method of claim 27, wherein determining the one or more polyhedrons comprises determining a minimum bounding box for each of the one or more features.

35. The method of claim 27, wherein generating the one or more polyhedral geofences comprises expanding the one or more polyhedrons based on a safe proximity distance, wherein the safe proximity distance is configured to provide a safe distance for the vehicle to move therefrom.

* * * * *